US00RE40632E

(19) United States
(12) Reissued Patent
Tang et al.

(10) Patent Number: US RE40,632 E
(45) Date of Reissued Patent: Feb. 3, 2009

(54) MASS SPECTROMETER SYSTEM INCLUDING A DOUBLE ION GUIDE INTERFACE AND METHOD OF OPERATION

(75) Inventors: Keqi Tang, Richland, WA (US); Jean-Jacques Dunyach, San Jose, CA (US); Alan E. Schoen, Saratoga, CA (US)

(73) Assignee: Thermo Finnigan LLC., San Jose, CA (US)

(21) Appl. No.: 11/073,394

(22) Filed: Mar. 4, 2005

Related U.S. Patent Documents

Reissue of:
(64) Patent No.: 6,528,784
Issued: Mar. 4, 2003
Appl. No.: 09/715,815
Filed: Nov. 16, 2000

U.S. Applications:
(63) Continuation-in-part of application No. 09/454,273, filed on Dec. 3, 1999, now abandoned.

(51) Int. Cl.
*B01D 59/44* (2006.01)
*H01J 49/00* (2006.01)

(52) U.S. Cl. ..... 250/282; 250/281; 250/288
(58) Field of Classification Search ..... 250/287, 250/288, 281, 282
See application file for complete search history.

(56) References Cited

U.S. PATENT DOCUMENTS

| | | | |
|---|---|---|---|
| 1,969,399 | A | 8/1934 | Farnsworth |
| 3,555,273 | A | 1/1971 | Arnold |
| 4,023,398 | A | 5/1977 | French et al. |
| 4,121,099 | A | 10/1978 | French et al. |
| 4,137,750 | A | 2/1979 | French et al. |

(Continued)

FOREIGN PATENT DOCUMENTS

| | | | |
|---|---|---|---|
| CA | 585694 | | 12/1988 |
| EP | 0023826 | A1 | 2/1981 |
| EP | 0023826 | B1 | 2/1984 |
| EP | 0113207 | A2 | 7/1984 |
| EP | 0813228 | A1 | 12/1997 |
| EP | 0 898 297 | | 2/1999 |
| EP | 0373835 | B1 | 4/2002 |
| JP | 171650 | | 6/1992 |
| JP | 269985 | | 9/1998 |
| WO | 98/06481 | | 2/1998 |

OTHER PUBLICATIONS

Scott L. Anderson & Luke Hanley, *Metal Cluster Ion Chemistry*, SPIE, vol. 669 (Laser Applications in Chemistry), pp. 133–136 (1986).

(Continued)

*Primary Examiner*—David A. Vanore
(74) *Attorney, Agent, or Firm*—Warren S. Wolfeld; Haynes, Beffel & Wolfeld LLP

(57) ABSTRACT

There is described an interface for delivering ions generated in an ion source into a mass analyzer in a chamber under vacuum pressure. In particular, the interface employs two consecutive ion guides operated to dissociate adduct ions formed in the ion source or high pressure regions of the interface between the ion source and the mass analyzer, thus improving the limit of detection or limit of quantitation of the mass analyzer by increasing the analyte ion current.

REEXAMINATION RESULTS

The questions raised in reexamination request no. 90/007, 724, filed Sep. 16, 2005 have been considered and the results thereof are reflected in this reissue patent which constitutes the reexamination certificate required by 35 U.S.C. 307 as provided in 37 CFR 1.570(e), for ex parte reexaminations, or the reexamination certificate required by 35 U.S.C. 316 as provided in 37 CFR 1.997(e) for inter partes reexaminations.

42 Claims, 8 Drawing Sheets

U.S. PATENT DOCUMENTS

| | | | |
|---|---|---|---|
| 4,148,196 | A | 4/1979 | French et al. |
| 4,328,420 | A | 5/1982 | French |
| 4,423,324 | A | 12/1983 | Stafford |
| 4,535,236 | A | 8/1985 | Batey |
| 4,540,884 | A | 9/1985 | Stafford et al. |
| 4,755,670 | A | 7/1988 | Syka et al. |
| 4,791,292 | A | 12/1988 | Cooks et al. |
| 4,842,701 | A | 6/1989 | Smith et al. |
| 4,963,736 | A | 10/1990 | Douglas et al. |
| 4,977,320 | A | 12/1990 | Chowdhury et al. |
| 5,026,987 | A | 6/1991 | Bier et al. |
| 5,049,739 | A | 9/1991 | Okamoto |
| 5,089,703 | A | 2/1992 | Schoen et al. |
| 5,107,109 | A | 4/1992 | Stafford, Jr. et al. |
| RE34,000 | E | 7/1992 | Syka et al. |
| 5,157,260 | A | 10/1992 | Mylchreest et al. |
| 5,162,650 | A | 11/1992 | Bier |
| 5,179,278 | A | 1/1993 | Douglas |
| 5,182,451 | A | 1/1993 | Schwartz et al. |
| 5,206,506 | A | 4/1993 | Kirchner |
| 5,298,743 | A | 3/1994 | Kato |
| 5,304,798 | A | 4/1994 | Tomany et al. |
| 5,412,208 | A | 5/1995 | Covey et al. |
| 5,420,425 | A | 5/1995 | Bier et al. |
| 5,432,343 | A | 7/1995 | Gulcicek et al. |
| 5,538,897 | A | 7/1996 | Yates, III et al. |
| 5,572,022 | A | 11/1996 | Schwartz et al. |
| 5,596,192 | A | 1/1997 | Waki |
| 5,652,427 | A | 7/1997 | Whitehouse et al. |
| 5,670,378 | A | 9/1997 | Man et al. |
| 5,739,530 | A | 4/1998 | Franzen et al. |
| 5,744,798 | A | 4/1998 | Kato |
| 5,747,799 | A | 5/1998 | Franzen |
| 5,750,993 | A | 5/1998 | Bier |
| 5,756,996 | A | 5/1998 | Bier et al. |
| 5,767,512 | A | 6/1998 | Eiden et al. |
| 5,811,800 | A | 9/1998 | Franzen et al. |
| 5,847,386 | A | 12/1998 | Thomson et al. |
| 5,852,294 | A | 12/1998 | Gulcicek et al. |
| 6,015,972 | A | 1/2000 | Hager |
| 6,017,693 | A | 1/2000 | Yates, III et al. |
| 6,107,623 | A | 8/2000 | Bateman et al. |
| 6,124,591 | A | 9/2000 | Schwartz et al. |
| 6,259,091 | B1 | 7/2001 | Eiden et al. |
| 6,331,702 | B1 | 12/2001 | Krutchinsky et al. |
| 6,680,475 | B2 | 1/2004 | Krutchinsky et al. |
| 6,700,120 | B2 | 3/2004 | Hager |
| 6,753,523 | B1 | 6/2004 | Whitehouse et al. |
| 6,987,264 | B1 | 1/2006 | Whitehouse et al. |
| 2004/0144916 | A1 | 7/2004 | Krutchinsky et al. |

OTHER PUBLICATIONS

J. Scott Anderson & David A. Laude, *Experimental methods to alleviate ion coupling effects in matrix–assisted laser desorption ionization Fourier transform ion cyclotron resonance mass spectrometry,* Int'l . J. Mass Spectrometry & Ion Processes, vol. 157/158, pp. 163–174 (1996).

Amos Bairoch & Brigitte Boeckmann, *The SWISS–PROT protein sequence data bank, recent developments*, Nucleic Acids Research, vol. 21, No. 13, pp. 3093–3096 (1993).

Vladimir I. Baranov & Scott D. Tanner, *A dynamic reaction cell for inductively coupled plasma mass spectrometry*(ICP–DRC–MS): Part 1. *The rf–field energy contribution in thermodynamics of ion–molecule reactions*, J. Anal. At. Spectrom., vol. 14, 1133–1142 (1999).

M. Barber et al., *Fast atom bombardment of solids as an ion source in mass spectrometry*, Nature, vol. 293, pp. 270–275 (1981).

Charles J. Barinaga & David W. Koppenaal, *Ion–trap Mass Spectrometry with an Inductively Coupled Plasma Source*, Rapid Communications in Mass Spectrometry, vol. 8, pp. 71–76 (1994).

Winona C. Barker et al., Protein Sequence Database, in Methods in Enzymology, vol. 183 (Molecular Evolution: Computer Analysis of Protein and Nucleic Acid Sequences) pp. 31–49 (Russell F. Doolittle ed. 1990).

J. Batey, "Pittcon 2000."

J.H. Batey, *An Overview of Collision Cells and Allied Technology for Attenuating Molecular Ion Interferences*(1999) VG Elemental, Issue 1.

J. Batey & S. Nelms, *Performance Characteristics of a Multipole Collision Cell ICP–MS*. (1999).

Jonathan H. Batey & John M. Tedder, *The Study of Ion–Molecule Reactions in Gas Phase using a Triple Quadrupole Mass Spectrometer. Part 1 . The Reactions of* $CH_3^+$, $CD_3^+$, and $C_2H_5^+$ *with Simple Olefins*, J. Chem. Soc. Perkin Trans. II, pp. 1263–1267 (1983).

Gökhan Baykut et al., *Matrix–assisted laser desorption/ionization Fourier transform ion cyclotron resonance mass spectrometry with pulsed in–source collision gas and in–source ion accumulation*, Rapid Commun. Mass Spectrom., vol. 14, pp. 1238–1247 (2000).

Beaugrand et al., *Ion Confinement in the Collision Cell of a Multiquadrupole Mass Spectrometer: Access to Chemical Equilibrium and Determination of Kinetic and Thermodynamic Parameters of an Ion–Molecule Reaction*, Am. Chem. Soc., vol. 61, pp. 1447–1453 (1989).

K. Birkinshaw et al., *The focusing of an ion beam from a quadrupole mass filter using an electrostatic octopole lens*, J. Phys. E: Sci. Instrum., vol. 11, pp. 1037–1040 (1978).

D.K. Bedford & D. Smith, *Variable–Temperature Selected Ion Flow Tube Studies of the Reactions of* $Ar^+$, $Ar_2^+$ and $ArH_n^+$ *(n=1–3)Ions with H2, HD and D2 at 300 K and 80 K*, Int'l. J. Mass Spectrom. & Ion Processes, vol. 98, 179–190 (1990).

Charles A. Boitnott, Urs Steiner & John R.B. Slayback, *Optimization of Instrument Parameters for Collision Activated Decomposition (CAD)Experiments for a Finnigan Triple Stage Quadrupole GC/MS/MS/DS*, Pittsburgh Conference Abstracts (1981).

C.A. Boitnott, J.R.B. Slayback & U. Steiner, *Optimization of Instrument Parameters for Collision Activated Decomposition (CAD) Experiments for a Triple Stage Quadrupole (TSQ™)GC/MS/MS/DS*, Finnigan MAT, Finnigan Topic 8160 (1981).

Stu Borman, *Combinatorial Synthesis Hits the Spot*, Chem. & Eng'g News, vol. 78, No. 27, pp. 25–27 (Jul. 3, 2000).

J.A. Buckley et al., *TAGA 6000—A New Triple Quadrupole MS/MS System for the Rapid Ultrasensitive Screening for Trace Contaminants, Abstracts*, 1981 Pittsburgh Conference on Analytical Chemistry and Applied Spectroscopy, No. 783.

Christian Burks et al., *GenBank: Current Status and Future Directions, in Methods in Enzymology*, vol. 183 (Molecular Evolution: Computer Analysis of Protein and Nucleic Acid Sequences), pp. 3–22 (Russell F. Doolittle ed. 1990).

V.J. Caldecourt, D. Zakett & J.C. Tou, *An Atmospheric–Pressure Ionization Mass Spectrometer/Mass Spectrometer*, Int'l J. Mass Spectrometry & Ion Physics, vol. 49, pp. 233–251 (1983).

Byungchul Cha et al., *An Interface with a Linear Quadrupole Ion Guide for an Electrospray–Ion Trap Mass Spectrometer System*, Anal. Chem., vol. 72, pp. 5647–5654 (2000).

Yu–Luan Chen et al., *Collision Cross Sections of Myoglobin and Cytochrome c Ions with Ne, Ar, and Kr*, J. Am. Soc. Mass Spectron, vol. 8, pp. 681–687 (1997).

Swapan K. Chowdhury et al., *An Electrospray–ionization Mass Spectrometer with New Features, Rapid Communications in Mass Spectrometry*, vol. 4, No. 3, pp. 81–87 (1990).

D.A. Church, *Storage–Ring Ion Trap Derived from the Linear Quadrupole Radio–Frequency Mass Filter*, J. Appl. Phys., vol. 40, No. 8, pp. 3127–3134 (1969).

Jeffrey S. Crain et al., *Matrix interferences in inductively coupled plasma–mass spectrometry: some effects of skimmer orifice diameter and ion lens voltages*, Spectrochimica Acta, vol. 43B, Nos. 9–11, pp. 1355–1364 (1988).

P.H. Dawson et al., *The Use of Triple Quadrupoles for Sequential Mass Spectrometry: 1—The Instrument Parameters*, Organic Mass Spectrometry, vol. 17, No. 5, pp. 205–211 (1982).

P.H. Dawson et al., *The Use of Triple Quadrupoles for Sequential Mass Spectrometry: 2—A Detailed Case Study*, Organic Mass Spectrom., vol. 17, No. 5, pp. 212–219 (1982).

P.H. Dawson & D.J. Douglas, *Quantitative Studies of the Kinetics of Ion Dissociation and Ion Molecule Declustering Using a Triple Quadrupole*, Proc. 29$^{th}$ Ann. Conf. on Mass Spectrometry (1981).

P.H. Dawson & N.R. Whetten, Mass Spectroscopy Using RF Quadrupole Fields, in Advances in Electronics and Electron Physics, vol. 27, pp. 59–185 (L. Marton ed., 1969).

A. Dodonov et al., abstract for *A new technique for decomposition of selected ions in molecule ion reactor coupled with ortho–time–of–flight mass spectrometry*, Rapid Commun. Mass Spectrom., vol. 11, 1649–59 (1997).

G.G. Dolnikowski et al., *Ion–Trapping Tecnique for Ion/Molecule Reaction Studies in the Center Quadrupole of a Triple Quadrupole Mass Spectrometer*, Int'l J. Mass Spectrom. & Ion Processes, vol. 82, pp. 1–15 (1988).

Vladimir M. Doroshenko & Robert J. Cotter, *Injection of Externally Generated Ions into an Increasing Trapping Field of a Quadrupole Ion Trap Mass Spectrometer*, J. Mass Spectrom., vol. 31, pp. 602–615 (1997).

D.J. Douglas, *Mechanism of Collision–Induced Dissociation of Polyatomic Ions Studied by Triple Quadrupole Mass Spectrometry*, J. Phys. Chem., vol. 86, pp. 185–191 (1982).

D.J. Douglas, *Some Current Perspectives on ICP–MS*, Canadian J. Spectroscopy, vol. 34, pp. 38–49 (1989).

D.J. Douglas & J.B. French, *Collisional Focusing Effects in Radio Frequency Quadrupoles*, J. Am. Soc. Mass Spectrom., vol. 3, pp. 398–408 (1992).

Steven F. Durrant, *Alternatives to all–argon plasmas in inductively coupled plasma mass spectrometry (ICP–MS)an overview*, Fresenius J. Anal. Chem., vol. 347, pp. 389–392 (1993).

Gregory C. Eiden et al., *Selective Removal of Plasma Matrix Ions in Plasma Source Mass Spectrometry*, J. Analytical At. Spectrom., vol. 11, pp. 317–322 (1996).

G.C. Eiden et al., *Plasma Source Ion Trap Mass Spectrometry: Enhanced Abundance Sensitivity by Resonant Ejection of Atomic Ions*, J. Am. Soc. Mass Spectrom., vol. 7, 1161–1171 (1996).

Jimmy K. Eng, Ashley L. McCormack, & John R. Yates, III, *An Approach to Correlate Tandem Mass Spectral Data of Peptides with Amino Acid Sequences in a Protein Database*, J. Am. Soc. Mass Spectrom., vol. 5, pp. 976–989 (1994).

Kent M. Ervin & P.B. Armentrout, *Translational energy dependence of* $Ar^{+}+XY \rightarrow ArX^{+}+Y(XY=H_2D_2HD)$ *from thermal to 30 eV c.m.*, J. Chem Phys., vol. 83, pp. 166–189 (1985).

W. Frobin, Ch. Schlier, K. Strein, & E. Teloy, *Ion–molecule reactions of N+ with CO: Integral reactive cross sections in the collision energy range 0.2–13 eV* (1977).

D. Gerlich, Dynamics of ion–molecule collisions at very low energies: Molecular beams, crossed and merged with guided ion beams, in XII International Symposium on Molecular Beams, pp. 37–40 (V. Aquilanti ed., 1989).

Dieter Gerlich, *Inhomogeneous RF Fields: A Versatile Tool for the Study of Processes with Slow Ions*, in State–Selected and State–to–State Ion–Molecule Reaction Dynamics, Part 1: Experiment, vol. 82, pp. 1–176 (Cheuk–Yiu Ng & Michael Baer eds., 1992).

D. Gerlich & M. Wirth, *Low Energy Crossed–Beam Study of the Reaction* $N^{+}=0_2 \rightarrow NO^{+}+0$, in Symposium on Atomic and Surface Physics, pp. 366–371 (F. Howorka ed., 1986).

G.W. Goodrich & W.C. Wiley, *Continuous Channel Electron Multiplier*, 33 Rev. Sci. Instrum., vol. 33, pp. 761–762 (1962).

R. Gradewald, *Das Verhalten geladener Teilchen in elektrischen Vierpolfeldern*, Ann. Physik, vol. 20, pp. 1–13 (1967) (English translation enclosed).

Patrick R. Griffin et al., Analysis of Proteins by Mass Spectrometry, in Techniques in Protein Chemistry III, pp. 467–476 (1992).

Patrick R. Griffin et al., *Structural analysis of proteins by capillary HPLC electrospray tandem mass spectrometry*, Int'l J. Mass Spectrometry & Ion Processes, vol. 111, pp. 131–149 (1991).

Zoe Grosser et al., *Current Measurement Capabilities for Endocrine Disrupting Compounds*, Proc. 16$^{th}$ Annual Waste Testing & Quality Assurance Symposium (2000).

Bodo Hattendorf & Detlef Günther, *Characteristics and capabilities of an ICP–MS with a dynamic reaction cell for dry aerosols and laser ablation*, J. Anal. At Spectrom., vol. 15, pp. 1125–1131 (2000).

Ivan Haller et al., *Collision Induced Decomposition of Peptides: Choice of Collision Parameters*, J. Am. Soc. Mass Spectrom., vol. 7, pp. 677–681 (1996).

Luke Hanley & Scott L. Anderson, *Chemistry and Cooling of Transition Metal Cluster Ions*, Chem. Phys. Lett., vol. 122, pp. 410–414 (1985).

Luke Hanley, Stephen A. Ruatta, & Scott L. Anderson, *Collision–induced dissociation of aluminum cluster ions: Fragmentation patterns, bond energies, and structures for* $Al_{2^+}$–$Al_{7^+}$ (1987).

P.H. Hemberger et al., *Laser photodissociation probe for ion tomography studies in a quadrupole ion–trap mass spectrometer*, Chem. Phys. Lett., vol. 191, No. 5, pp. 405–410 (1992).

William J. Henzel et al., *Identifying proteins from two–dimensional gels by molecular mass searching of peptide fragments in protein sequence databases*, Proc. Nat'l Acad. Sci. USA, vol. 90, pp. 5011–5015 (1993).

R.S. Houk, *Mass Spectrometry of Inductively Coupled Plasmas*, Analytical Chem., vol. 58, No. 1, pp. 97–105 A (1986).

Donald F. Hunt et al., *Protein sequencing by tandem mass spectrometry*, Proc. Nat'l Acad. Sci. USA, vol. 83, pp. 6233–6237 (1986).

*Index of the Protein Sequence Database of the International Association of Protein Sequence Databanks*(*PIR–International*), Protein Seq. Data Anal., vol. 5, Nos. 2–4, pp. 65–192 (1993).

S.A. Jarvis et al., *Spectrometer*, Proc. 45$^{th}$ASMS Conf. on Mass Spectrometry and Allied Topics, p. 1193 (1997).

Mark Johnston, *Energy Filtering in Triple Quadrupole MS/MS*, Application Report, No. 203 (1984).

Karen R. Jonscher & John R. Yates III, *Matrix–assisted Laser Desorption Ionization/Quadrupole Ion Trap Mass Spectrometry of Peptides*, J. Biological Chem., vol. 272, No. 3, pp. 1735–1741 (1997).

Karen R. Jonscher & John R. Yates III, *Mixture Analysis Using a Quadrupole Mass Filter/Quadrupole Ion Trap Mass Spectrometer*, Anal. Chem., vol. 68, pp. 659–667 (1996).

Karen R. Jonscher et al., *Matrix–assisted Laser Desorption of Peptides and Proteins on a Quadrupole Ion Trap Mass Spectrometer*, Rapid Communications in Mass Spectrometry, vol. 7, pp. 20–26 (1993).

Karen R. Jonscher & John R. Yates, III, *The Whys and Wherefores of Quadrupole Ion Trap Mass Spectrometry*, with version available at http://www.abrf.org/ABRFNews/1996/September1996/sep96iontrap.html (last revised Sep. 30, 1996).

Patricia Kahn & Graham Cameron, EMBL Data Library, in Methods in Enzymology, vol. 183 (Molecular Evolution: Computer Analysis of Protein and Nucleic Acid Sequences), vol. 183, pp. 23–31 (Russell F. Doolittle ed. 1990).

H.I. Kenttämaa et al., *Scanning a Triple Quadrupole Mass Spectrometer for Doubly Charged Ions*, Organic Mass Spectrometry, vol. 18, No. 12, pp. 561–566 (1983).

F.L. King & W.W. Harrison, *Collision–Induced Dissociation of Polyatomic Ions in Glow Discharge Mass Spectrometry*, Int'l J. Mass Spectrom. & Ion Processes, vol. 89, pp. 171–185 (1989).

F.L. King et al., *Study of Molecular Interferences in Glow Discharge Mass Spectrometry*, J. Analytical At. Spectrom., vol. 3, pp. 883–886 (1988).

P. Kofel et al., *A Novel Quadrupole, Quistor, Quadrupole Tandem Mass Spectrometer*, Organic Mass Spectrometry, vol. 26, pp. 463–467 (1991).

David W. Koppenaal et al., *Performance of an Inductively Coupled Plasma Source Ion Trap Mass Spectrometer*, J. Analytical Atomic Spectrometry, vol. 9, pp. 1053–1058 (1994).

R. Kostianen, *Characterization of Trichotecenes by Tandem Mass Spectrometry Using Reactive Collisions with Ammonia*, Biomedical & Environmental Mass Spectrometry, vol. 16, pp. 197–200 (1988).

A.N. Krutchinsky et al., *Orthogonal Injection of Matrix–assisted Laser Desorption/Ionization Ions into a Time–of–flight Spectrometer Through a Collisional Damping Interface*, Rapid Commun. Mass Spectrom., vol. 12, pp. 508–518 (1998).

Andrew N. Krutchinsky et al., *Rapidly Switchable Matrix–Assisted Laser Desorption/Ionization and Electrospray Quadrupole–Time–of–Flight Mass Spectrometry for Protein Identification*, J. Am. Soc. Mass Spectrom., vol. 11, pp. 493–504 (2000).

Victor V. Laiko et al., *Atmospheric Pressure MALDI/Ion Trap Mass Spectrometry*, Anal. Chem., vol. 72, pp. 5239–5243 (2000).

S.A. Lammert, *Toroidal RF Ion Trap Mass Analyzer*(revised 2001), at http:/www.orml.gov/sci/casd/lammert/sal_research_toroid.html (visited on Nov. 4, 2004).

John Latino et al., *Advantages of Dynamic Bandpass Tuning in Dynamic Reaction Cell ICP–MS*, Application Note (2001).

Alexander Loboda et al., abstract for *Novel Linac II electrode geometry for creating an axial field in a multipole ion guide*, Eur. J. Mass Spectrom., vol. 6, pp. 531–536 (2000).

Alexander Loboda et al., *Novel LINAC II electrode geometry to create an axial field in a multipole ion guide*, available at http://www.physics.umanitoba.ca/~ens/ASMS2000Loboda.pdf (visited on Jun. 29, 2005).

Alexander Loboda et al., Poster, *Novel LINAC II electrode geometry to create an axial field in a multipole ion guide*, available at http://www.physics.umanitoba.ca/~ens/ASMS2000LobodaPoster.pdf (visited on Jun. 29, 2005).

Honway Louie & Susan Yoke–Peng Soo, *Use of Nitrogen and Hydrogen in Inductively Coupled Plasma Mass Spectrometry*, J. Analytical Atomic Spectrometry, vol. 7, pp. 557–564 (1992).

J.F. Mahoney et al., *Improving the Detection Sensitivity for High Mass Ions*, Proc. 36$^{th}$ ASMS Conference on Mass Spectrometry and Allied Topics, 1988.

Raymond E. March, *An Introduction to Quadrupole Ion Trap Mass Spectrometry*, J. Mass Spectrometry, vol. 32, pp. 351–369 (1997).

William McFadden, Techniques of Combined Gas Chromatography Mass Spectrometry: Applications in Organic Analysis, pp. 51–52 (1973).

Scott A. McLuckey et al., *Radio–Frequency Glow Discharge Ion Trap Mass Spectrometry*, Anal. Chem., vol. 64, pp. 1616–1609 (1992).

Scott A. McLuckey et al., *Tandem Mass Spectrometry of Small, Multiply Charged Oligonucleotides*, J. Am. Soc. Mass Spectrom., vol. 3, pp. 60–70 (1992).

S. Mills, "WPC2000", Sep. 99, VGE Issue 1.

Kenneth Neubauer & Uwe Völlkopf, *The Benefits of a Dynamic Reaction Cell to Remove Carbon– and Chloride–Based Spectral Interferences by ICP–MS*, Atomic Spectroscopy, vol. 20(2), pp. 64–66 (1999).

Kenneth R. Neubauer & Ruth E. Wolf, *Determination of arsenic in chloride matrices, ICP Mass Spectrometry: Application Note* (2000).

José A. Olivares et al., *On–Line Mass Spectrometric Detection for Capillary Zone Electrophoresis,* Anal. Chem., vol. 59, No. 8, pp. 1230–1232 (1987).

E. Poussel et al., *Dissociation of Analyte Oxide Ions in Inductively Coupled Plasma Mass Spectrometry,* J. Analytical Atomic Spectrometry, vol. 9, pp. 61–66 (1994).

Linda A. Powell & G.M. Hieftje, *Computer Indentification of Infrared Spectra by Correlation–Based File Searching*, Analytica Chimica Acta, vol. 100, pp. 313–327 (1978).

Quadrupole Mass Spectrometry and Its Applications (Peter H. Dawson ed., 1976) (excerpts).

Jun Qin & Brian T. Chait, *Identification and Characterization of Posttranslational Modifications of Proteins by MALDI Ion Trap Mass Spectrometry*, Anal. Chem., vol. 69, No. 19, pp. 4002–4009 (1997).

Jun Qin & Brian T. Chait, *Matrix–Assisted Laser Desorption Ion Trap Mass Spectrometry: Efficient Trapping and Ejection of Ions*, Anal. Chem., vol. 68, No. 13, pp. 2102–2107 (1996).

Jun Qin & Brian T. Chait, *Matrix–Assisted Laser Desorption Ion Trap Mass Spectrometry: Efficient Isolation and Effective Fragmentation of Peptide Ions*, Anal. Chem., vol. 68, No. 13, pp. 2108–2112 (1996).

Jun Qin et al., *A Practical Ion Trap Mass Spectrometer for the Analysis of Peptides by Matrix–Assisted Laser Desorption/Ionization*, Anal. Chem., vol. 68, No. 10, pp. 1784–1791 (1996).

*Recent developments in ICP–MS*, "Bmass 2000", 1999 VGE Issue 1.

John T. Rowan & R.S. Houk, *Attenuation of Polyatomic Ion Interferences in Inductively Coupled Plasma Mass Spectrometry by Gas–Phase Collisions*, Applied Spectroscopy, vol. 43, No. 6, pp. 976–980 (1989).

Schaaf, U. Schmeling & G. Werth, *Trapped Ion Density Distribution in the Presence of He–Buffer Gas*, Appl. Phys., vol. 25, pp. 249–251 (1981).

S. Scherbarth & D. Gerlich, *Energy partitioning in Ar+ + 02 collisions at low energies: Analysis of product states by laser–induced predissociation*, J. Chem. Phys., vol. 90, No. 3, pp. 1610–1623 (1989).

A.E. Schoen & John E.P. Syka, *Improvement in High Mass Ion Detection of a Tandem Quadrupole Mass Spectrometer Using a High Voltage Post–Acceleration Detector*, Proc. 36$^{th}$ ASMS Conference on Mass Spectrometry and Allied Topics, 1988.

Andrej Shevchenko et al., *Rapid 'de Novo' Peptide Sequencing by a Combination of Nanoelectrospray, Istopic Labeling and a Quadrupole/Time–of–flight Mass Spectrometer*, Rapid Commun. Mass Spectrom., vol. 11, pp. 1015–1024 (1997).

Naoko Shibata et al., *Effects of hydrogen mixed with argon carrier gas in electrothermal vaporization–inductively coupled plasma–mass spectrometry*, Spectrochimica Acta, vol. 47B, No. 4, pp. 506–516 (1992).

J.R.B. Slayback et al., *Determination of Metipranolol in Serum by Triple Stage Quadrupole(TSQ) 198 GC/MS/MS/DS,* Finnigan Topic 8161, presented at 1981 Pacific Conference on Chemistry and Spectroscopy.

Fred G. Smith et al., *Argon–Xenon Plasma for Alleviating Polyatomic Ion Interferences in Inductively Coupled Plasma Mass Spectrometry,* Anal. Chem., vol. 63, pp. 1458–1462 (1991).

Jason Smolanoff, Adam Lapicki & Scott L. Anderson, *Use of a quadrupole mass filter for higher energy resolution ion beam production*, Rev. Sci. Instrum., vol. 66(6), pp. 3706–3708 (1995).

G.C. Stafford, Jr., et al., *Recent Improvements in and Analytical Applications of Advanced Ion Trap Technology*, Int'l J. Mass Spectrom. & Ion Processes, vol. 60, pp. 85–98 (1984).

John E.P. Syka, *Commercialization of the Quadrupole Ion Trap, in 1 Practical Aspects of Ion Trap Mass Spectrometry* 169–205 (Raymond E. March & John F.J. Todd eds., 1995).

Imre Szabo, *New Ion–Optical Devices Utilizing Oscillatory Electric Fields. I. Principle of Operation and Analytical Theory of Multipole Devices with Two–Dimensional Electric Fields*, Int. J. Mass Spec. Ion Proc., vol. 73, pp. 197–235 (1986).

Scott D. Tanner & Vladimir I. Baranov, *A Dynamic Reaction Cell for Inductively Coupled Plasma Mass Spectrometry, (ICP–DRC–MS). II. Reduction of Interferences Produced Within the Cell*, J. Am. Soc. Mass Spectrom., vol. 10, pp. 1083–1094 (1999).

Scott D. Tanner et al., *Reaction cells and collision cells for ICP–MS: a tutorial review*, Spectrochimica Acta Part B, vol. 57, pp. 1361–1452 (2002).

Scott D. Tanner et al., *A dynamic reaction cell for inductively coupled plasma mass spectrometry(ICP–DRC–MS):Part III. Optimization and analytical performance*, J. Anal. At. Spectrom., vol. 15, pp. 1261–1269 (2000).

Scott D. Tanner et al., Reaction Chemistry and Collisional Processes in Multipole Devices, in Plasma Source Mass Spectrometry: The New Millenium 99–116 (2001).

E. Teloy, Proton–Hydrogen ($H_2$, $D_2$) differential Inelastic and Reactive Scattering at Low Energies, in Electronic and Atomic Collisions, pp. 591–603 (G. Watel ed., 1978).

Bruce A. Thomson et al., *Improved Collisionally Activated Dissociation Efficiency and Mass Resolution on a Triple Quadrupole Mass Spectrometer System*, Anal. Chem., vol. 67, pp. 1696–1704 (1995).

Patrick Turner et al., Interface Studies in the ICP–Mass Spectrometer, in Plasma Source Mass Spectrometry: Developments and Applications 28–34 (1997).

Victor H. Vartanian, J. Scott Anderson, & David A. Laude, *Advances in Trapped Ion Cells for Fourier Transform Ion Cyclotron Resonance Mass Spectrometry*, Mass Spectrometry Reviews, vol. 14, pp. 1–19 (1995).

F. Vedel & J. Andre, *Influence of space charge on the computed statistical properties of stored ions cooled by a buffer gas in a quadrupole rf trap*, Phys. Rev. A, vol. 29, No. 4, starting on p. 2098 (1984).

J. Visser, *Mass Spectrometric Analysis of the Sputter Gas Atmosphere without Pressure Reduction System*, J. Vac. Sci. Tech., vol. 10, No. 3, pp. 464–471 (1973).

Uwe Völlkopf et al., ICP–MS Multielement Analysis at Sub–PPT Levels Applying New Instrumental Design Concepts, in Fundamentals of Plasma Source Mass Spectrometry, pp. 63–79 (1999).

P.E. Walters & C.A. Barnardt, *The role of desolvation and hydrogen addition on the excitation features of the inductively coupled plasma*, Spectrochimica Acta, vol. 43B, pp. 325–337 (1988).

John R. Yates, III et al., *Peptide Mass Maps: A Highly Informative Approach to Protein Identification*, Analytical Biochemistry, vol. 214, pp. 1–12 (1993).

John R. Yates III, et al., Computer Aided Interpretation of Low Energy MS/MS Mass Spectra of Peptides, in Techniques in Protein Chemistry II, pp. 477–485 (1991).

Bio–CD, advertisement, *BIO–CD™: compact disc platform for DNA detection*, date unknown.

Burstein Laboratories, Inc., advertisement, *Burstein: A World of Invention*, date unknown.

Finnigan, TSQ drawings, containing dates between 1980–1984.

Finnigan Corp., *Research Prototype: Triple Stage Quadrupole GC/MS/MS/DS System* (1981).

Finnigan MAT, *Models TSQ–45A/TSQ–46A: GC/MS/MS/DS Systems* (1984).

Finnigan MAT, *Specifications: Models TSQ–45A/TSQ–46A*, date unknown.

Finnigan MAT, *Price Information: New Option for TSQ® 45, TSQ® 46* (1986).

Finnigan MAT, *Triple Stage Quadrupole GC/MS/MS/DS System* (1981).
Matrix Science, *Technical Brief: Mascot Overview* (1999).
Micromass UK Limited, LCT User's Guide, date unknown.
*API 3000™ LC/MS/MS System* (2001).
*API 2000™ LC/MS/MS System: Triple Quadrupole Performance in a Compact Benchtop Footprint Featuring Applied Biosystems/MDS SCIEX Ion Sources for Maximum Flexibility and Ease–of–Use* (2001).
Channeltron Electron Multiplier Handbook for Mass Spectrometry Applications, available at http://www.burle.com/cgi–bin/byteserver.pl/pdf/ChannelBook.pdf, date unknown.
API Book, pp. 17, 25, 27, 44, date unknown.
*Sciex™, TAGA™ 6000 MS/MS: A High Performance Tandem Mass Spectrometer System* (1981).
Yost, R.A., et al., "Triple Quadrupole Mass Spectrometry for Direct Mixture Analysis and Structure Elucidation," *Analytical Chemistry,*vol. 51, No. 12 (Oct. 1979) p. 1251, 1252, 1256 and even pages through 1264.
Dawson, P.H., et al., "The Effective Containment of Parent Ions and Daughter Ions in Triple Quadrupoles Used for Collisional Dissociation," *Int. Hournal of Mass Spectrometry and Ion Physics*, 42 (1982) 195–211.
Teloy, E., et al., "Integral Cross Sections for Ion–Molecule Reactions. 1. The Guided Beam Technique," *Chemical Physics*, 4 (1974) 417–427.
Jarrold, Martin F., et al. "A crossed beam study of the reaction of $CO^+$ with $O_2$," *Molecular Physics* (1980) vol. 39, No. 4, 787–798.
McIver, Jr., Robert et al., "Coupling a Quadrupole Mass Spectrometer and a Fourier Transform Mass Spectrometer," *Int. J. Mass Spectrometry and Ion Processes*, 64 (1985) 67–77.
Hagg, Conny, et al., "New Ion–Optical Devices Utilizing Oscillatory Electric Fields. IV. Computer Simulations of the Transport of an Ion Beam Through an Ideal Quadrupole, Hexapole, and Octopole Operating in the RF–Only Mode," *Int. J. Mass Spectrometry and Ion Processes*, 73 (1986) 295–312.
Smith, Richard D., et al., "Capillary Zone Electrophresis—Mass Spectrometry Using an Electrospray Ionization Interface," *Anal. Chem.*(1988) 60, 436–441.
Beu, Steven C., et al., "Fourier–Transform Electrospray Instrumentation for Tandem High–Resolution Mass Spectrometry of Large Molecules," *Am Soc for Mass Spectrometry*, (1993) 1044–0305.
Kleintop, Brent L. et al., "Analyzing Thermally Labile Compounds in Electrospray Sources using Heated Capillaries," *43rd ASMS Conference on Mass Spectrometry and Allied Topics*, May 1995.
Pasa–Tolic, Ljiljana, et al., "High–Field Electrospray FT–ICR Mass Spectrometer for Biopolymer Analysis," *43rd ASMS Conference on Mass Spectrometry and Allied Topics*, May 1995.
DeSantolo, Anthony M., et al., "Performance of an External Cluster Ion Source and Electrostatic Ion Guide," *43rd ASMS Conference on Mass Spectrometry and Allied Topics*, May 1995.
Schwartz, Jae C., et al., "Technological Aspects of a New LC/$MS^n$ Quadrupole Ion Trap," *43rd ASMS Conference on Mass Spectrometry and Allied Topics*, May 1995.
Bier, Mark E., et al., "Ion Optics and Design Considerations for a New LC/Quadrupole Ion Trap," *43rd ASMS Conference on Mass Spectrometry and Allied Topics*, May 1995.
Thomson, Bruce, "Protein Charge Distribution Studies—From Droplet in Air to Ion in Vacuum," *44th ASMS Conference on Mass Spectrometry and Allied Topics*, May 1996.
Goodley, Paul C., et al., "An API Liquid Coupling Device for Ion Traps for Eliminating Droplets and Cluster Ions," *45th d ASMS Conference on Mass Spectrometry and Allied Topics*, Jun. 1997.
Takada, Yasuaki, et al., "Highly Sensitive Liquid Chromotography/Three Dimensional Quadrupole Mass Spectrometry Using an APCI Interface," *45th ASMS Conference on Mass Spectrometry and Allied Topics,* Jun. 1997.
Takada, Yasuaki, et al., "A Multi–API Interface Combined with 3DQMS for Environmental and Biological Applications," *45th ASMS Conference on Mass Spectrometry and Allied Topics*, Jun. 1997.
Li, Guo–Zhong, et al., "Evaporative Cooling of Highly Charged Electrosprayed Ions in a 9.4 tesla ESI FT–ICR Mass Spectrometer," *45th ASMS Conference on Mass Spectrometry and Allied Topics*, Jun. 1997.
Dodonov, A., et al., "Molecule Ion Reactor (MIR) Time–of–Flight mass spectrometer equipped with an Electrospray Ion Source," *45th ASMS Conference on Mass Spectrometry and Allied Topics*, Jun. 1997.
Jarvis, S.A., et al., "A New Atmospheric Pressure Ionisation Orthogonal Acceleration Time of Flight Mass Spectrometer," *45th ASMS Conference on Mass Spectrometry and Allied Topics*, Jun. 1997.
Buchanan, Michelle V., et al., "Continuous Octapole Electrospray Introduction System for FTICR," *46th ASMS Conference on Mass Spectrometry and Allied Topics*, Jun. 1998.
Marto, Jarrod A., et al. "Optimization of Fourier Transform Mass Spectrometry for Low Level Peptide Sequencing and Analysis," *46th ASMS Conference on Mass Spectrometry and Allied Topics*, Jun. 1998.
J. M. Lazar et al., "Design of a Time–of–Flight Mass Spectrometer as a Detector for Capillary Electrophoresis," *Analytical Chemistry*, 1997, vol. 69, No. 16, pp. 3205–3211.
R. D. Smith et al., "Collisional Activation and Collision–Activated Dissociation of Large Multiply Charged Polypetides and Proteins Produced by Electrospray Ionization," *J. Am. Soc. Mass Spectrom.*, 1990, vol. 1, No. 1, pp. 53–65.
M. V. Buchanan et al., "Continuous Octapole Electrospray Introduction System for FTICR," *46th ASMS Conference on Mass Spectrometry and Allied Topics*, May 31–Jun. 4, 1998, p. 518.
B. Thomson, "Protein Charge Distribution Studies—From Droplet in Air to Ion in Vacuum," *44th ASMS Conference on Mass Spectrometry and Allied Topics*, May 12–16, 1996, p. 1092.
H. Kambara et al, "Collision–Induced Dissociation of Water Cluster Ions at High Pressure," *Int'l J. Mass Spectrom. and Ion Physics*, 1977, vol. 25, pp. 129–136.
B. L. Kleintop et al., "Analyzing Thermally Labile Compounds in Electrospray Sources Using Heated Capillaries," *43rd ASMS Conference on Mass Spectrometry and Allied Topics*, May 21–26, 1995, p. 905.
S. C. Beu et al., "Fourier–Transform Electrospray Instrumentation for Tandem High–Resolution Mass Spectrometry of Large Molecules," *J. Am. Soc. Mass Spec.*, 1993, vol. 4, pp. 557–565.
S. A. Jarvis et al., "A New Atmospheric Pressure Ionization Orthogonal Acceleration Time of Flight Mass Spectrometer," *45th ASMS Conference on Mass Spectrometry and Allied Topics*, Jun. 1–5, 1997, p. 1193.

A.P. Bruins, "ESI Source Design and Dynamic Range Considerations," in *Electrospray Ionization Mass Spectrometry—Fundamentals, Instrumentation, and Applications*, (R.B. Cole ed., John Wiley & Sons, Inc., 1997), chp. 3, pp. 107–136.

AB/SCIEX's Supplemental Responses to Interrogatories 14 and 15 Thermo Finnegan LLC's First Set of Interrogatories (Nos. 1–28), dated Aug. 19, 2005.

AB/SCIEX's Revised Supplemental Responses to Interrogatories 14 and 15 of Thermo Finnigan LLC's First Set of Interrogatories (Nos. 1–28), dated Aug. 22, 2005.

AB/SCIEX's Response to Thermo Finnigan LLC's First Set of Interrogatories (Nos. 1–28), dated Jun. 20, 2005. (Answers 1–23 and 25–28 redacted).

Niessen, W. M., "Advances in Instrumentation in Liquid Chromatography—Mass Spectrometry and Related Liquid–Introduction Techniques," Journal of Chromatography, vol. 794, No. 1–2, Jan. 23, 1998, pp. 407–435.

Dawson, P.H., et al., "The Effective Containment of Parent Ions and Daugher Ions in Triple Quadrupoles Used for Collisional Dissociation," *Int. Journal of Mass Spectrometry and Ion Physics*, 42 (1982) 195–211.

Niessen, W. M., "Advances in Instrumentation in Liquid Chromatography–Mass Spectrometry and Related Liquid–Introduction Techniques," Journal of Chromatography, vol. 794, No. 1–2, Jan. 23, 1998, pp. 407–435.

AB/SCIEX's Supplemental Responses to Interrogatories 14 and 15 of Thermo Finnegan LLC's First Set of Interrogatories (Nos. 1–28), dated Aug. 19, 2005.

Richard D. Smith, et al., "Improved Electrospray Ionization Interface for Capillary Zone Electrophoresis–Mass Spectrometry," Anal. Chem., vol. 60, pp. 1948–1952 (1998).

Harold R. Udseth, et al., "Capillary Isotachophoresis/Mass Spectrometry," Anal. Chem., vol. 61, pp. 228–232 (1989).

Joseph A. Loo, et al., "Peptide and Protein Analysis by Electrospray Ionization—Mass Spectrometry and Capillary Electrophoresis–Mass Spectrometry," Anal. Biochem., vol. 179, pp. 404–412 (1989).

MASS SPECTROMETER SYSTEM INCLUDING A DOUBLE ION GUIDE INTERFACE AND METHOD OF OPERATION

Matter enclosed in heavy brackets [ ] appears in the original patent but forms no part of this reissue specification; matter printed in italics indicates the additions made by reissue.

RELATED APPLICATIONS

*Notice: More than one reissue application has been filed for the reissue of U.S. Pat. No. 6,528,784; the reissue applications are application Ser. No. 11/073,394 (the present application filed on Mar. 4, 2005), and application Ser. No. 12/330,902, filed Dec. 9, 2008, which is a continuation of the present reissue application Ser. No. 11/073,394.*

This application is a continuation-in-part-of- and claims priority to pending application Ser. No. 09/454,273 filed Dec. 3, 1999 now abandoned.

FIELD OF THE INVENTION

This invention relates generally to mass spectrometry, and more particularly to mass spectrometers employing atmospheric pressure ion sources such as electrospray or atmospheric pressure chemical ionization. More particularly, the invention relates to the use of two consecutive ion guides between the ion source and the mass analyzer to dissociate adduct ions, thus increasing the ion current for the analytically useful molecular species.

BACKGROUND OF THE INVENTION

Generally, the interface between the atmospheric pressure ion source and the mass analyzer includes a capillary tube or other restrictive aperture which determines ion and gas throughput between the atmospheric pressure ionization region and a lower pressure region. The ions are drawn through the capillary or other restrictive aperture and directed to a downstream conical skimmer with a small aperture through which the sample ions flow. A tube lens or other electrostatic or electrodynamic focusing element may be associated with the capillary to force ions to the center of the jet stream leaving the capillary to thereby increase the ion transmission through the aperture of the skimmer. Reference is made to U.S. Pat. No. 5,157,260 which describes the operation of an atmospheric pressure ionization source, capillary lens and conical skimmer. One or more vacuum stages are interposed between the skimmer and the mass analyzer which is operated at vacuum pressures in the free molecular flow region.

The prior art interface vacuum stages have included ion guides to transfer the ions through the stages of decreasing pressure into the mass analyzer. In many prior art systems, the ions are guided by electrostatic lenses. In other systems, the ions are guided by electrodynamic multipole ion guides.

The use of an r.f.-only octopole ion guide for focusing and guiding ion beams has been described by Teloy and Gerlich (Chem. Phys., Vol. 4, p. 417, 1974) and Jarrold et. al. (Mol. Phys., Vol. 39, p. 787, 1980).

The dissociation of mass-selected ions in an r.f.-only quadrupole by collision with a target gas at low translational energies ($E_{lab}$<about 100 eV) has been described by R. A. Yost and C. G. Enke et. al. (Anal. Chem., Vol. 51, p. 1251a, 1979), and Dawson et. al. (Int. J. Mass Spec. Ion Proc., Vol. 42, p. 195, 1982).

McIver et. al. described the use of an r.f.-only quadrupole ion guide for guiding a beam of mass-selected ions into a Fourier-transform ion cyclotron resonance mass analyzer (Int. J. Mass Spec. Ion Proc., Vol. 64, p. 67, 1985).

Szabo described the theory of operation for multipole ion guides with various electrode structures (Int. J. Mass Spec. Ion Proc., Vol. 73, pp. 197–312, 1986).

Efficient transport of ions through vacuum chambers by multipole ion guides has been described by Smith et. al. (Anal. Chem., Vol. 60, pp. 436–441, 1988).

Beu et. al. described the use of three quadrupole ion guides to transport ions from an atmospheric pressure ionization source through three vacuum pumping stages into a Fourier-transform ion cyclotron resonance mass analyzer (J. Am. Soc. Mass Spec., Vol. 4, pp. 557–565, 1993).

U.S. Pat. No. 4,963,736 describes the use of a multipole ion guide in the first pumping stage of a two-stage system. Operation of the multipole ion guide in certain length-times-pressure regimes is claimed for the purposes of enhancing ion signal.

U.S. Pat. Nos. 5,179,278 and 5,811,800 describe the temporary storage of ions in an r.f. multipole rod system for subsequent analysis in an rs.f. quadrupole ion trap mass spectrometer. This is done for the purpose of matching the time scales of compounds eluting from chromatographic or electrophoretic separation devices to the time scale of mass spectrometric analyses performed by an r.f. quadrupole ion trap.

U.S. Pat. No. 5,432,343 describes an ion focusing lensing system for interfacing an atmospheric pressure ionization source to a mass spectrometer. It describes the use of an electrostatic lens in a transition flow pressure region of the interface, claiming benefit of independent adjustment of operating voltages controlling the collisionally induced dissociation and declustering processes. Enhancement of ion beam transmission into the mass analyzer is also claimed.

U.S. Pat. No. 5,652,427 describes in one embodiment a system in which a multipole ion guide extends between two vacuum stages and in another embodiment a system which includes a multipole in each of two adjacent stages. Improved performance and lower cost are claimed.

U.S. Pat. No. 5,852,294 describes the construction of a miniature multipole ion guide assembly.

A goal to be achieved in all single or multiple interface vacuum chambers is to transport as many protonated molecular cations or molecular anions as possible from the atmospheric pressure ionization source to the mass analyzer. However, many solvent adduct ions which are formed in the high pressure region travel through the interface vacuum chambers into the analyzer. The process of solvent adduction in the mass spectrometer system is generally considered to be a non-covalent association between sample ions of interest and neutral solvent molecules. Thus, in the case of introduction of an analyte into an electrospray or atmospheric pressure chemical ionization source, the ion current produced from that analyte may be divided between the protonated molecular cation or molecular anion and one or more solvent adduct species. Specific detection is usually accomplished by monitoring the ion signal, or derivative of that signal, for one specific mass. In the case where solvent adducts are formed, the limit of detection or limit of quantitation for the analyte is reduced.

Experimental evidence indicates that these adduct ions are predominantly formed in the high pressure regions of the system ranging from the API source region through the interface vacuum regions. The degree of adduction varies directly with the pressures in these regions. The formation of adduct ions significantly reduces the abundance of sample analyte ions. Furthermore, the adduct ions which enter into the mass analyzer complicates the mass spectrum and make the identification of mass peaks more difficult.

OBJECTS AND SUMMARY OF THE INVENTION

It is an object of the present invention to provide a mass spectrometer system employing an ion source with multiple ion guides configured and operated to convert adduct ions into sample ions and a method of operating multiple ion guides to convert adduct ions into sample ions to thereby increase the analyte ions current and sensitivity of the mass spectrometer system.

In accordance with the invention, there is provided a mass spectrometer including a mass analyzer disposed in a high vacuum chamber for analyzing ions formed in an ionization source which includes first and second evacuated interface chambers immediately preceding the mass analyzer chamber, with the first interface chamber being at a higher pressure than the second interface chamber, and including a first ion guide for guiding ions from the ion source into said second interface chamber which includes a second multipole ion guide for guiding the ions from the first interface chamber into the high vacuum analyzer chamber for analysis. Both r.f. and DC potentials are applied to the said first and second ion guides to ensure ion focusing and transmission through related vacuum chamber. A first ion lens is disposed at the input of the first interface chamber for directing ions into the first multipole ion guide, an interchamber ion lens is disposed between the first and second interface chambers for directing ions into said second multipole ion guide, and an ion lens or a lens stack is disposed between the second interface chamber and the analyzer chamber for directing ions into said analyzer for analysis. These ion lenses also serve as gas conductance restrictors between said interface chambers.

A DC voltage source is connected to provide a potential difference between the first lens and the first multipole ion guide or between interchamber lens and the second multipole ion guide or both which defines the ion's translational kinetic energy as it enters the second multipole ion guide. The ion's translational kinetic energy is chosen such that at the vacuum pressure of the second interface chamber adduct ions are converted into sample ions by collision induced dissociation without fragmentation of sample ions whereby the sample ion current entering the analyzer is increased, thereby increasing the sensitivity of the mass spectrometer system.

There is provided a method of mass analyzing ions produced in an atmospheric pressure ionization source in which adduct ions formed in the mass spectrometer system are dissociated prior to analysis to increase the analyte ion current to the mass analyzer and the sensitivity of the mass spectrometer system.

There is provided a method of operating a mass spectrometer system in which an analyzer in a vacuum chamber analyzes ions formed in an atmospheric pressure ionization source. The system includes first and second multipole ion guides disposed in serial first and second evacuated chambers immediately preceding the analyzer. The method comprises applying a DC voltage between the ion lens preceding either the first or the second multipole ion guide to provide translational kinetic energy to the adduct ions sufficient to dissociate any adduct ions at the pressure of the second chamber without fragmenting the sample ions whereby to increase the sample ion current directed into the analyzer and the sensitivity of the mass spectrometer system.

BRIEF DESCRIPTION OF THE DRAWINGS

The foregoing and other objects of the invention will be more clearly understood from the following description when read in conjunction with the accompanying drawings in which.

DESCRIPTION OF PREFERRED EMBODIMENTS

Figure 1:
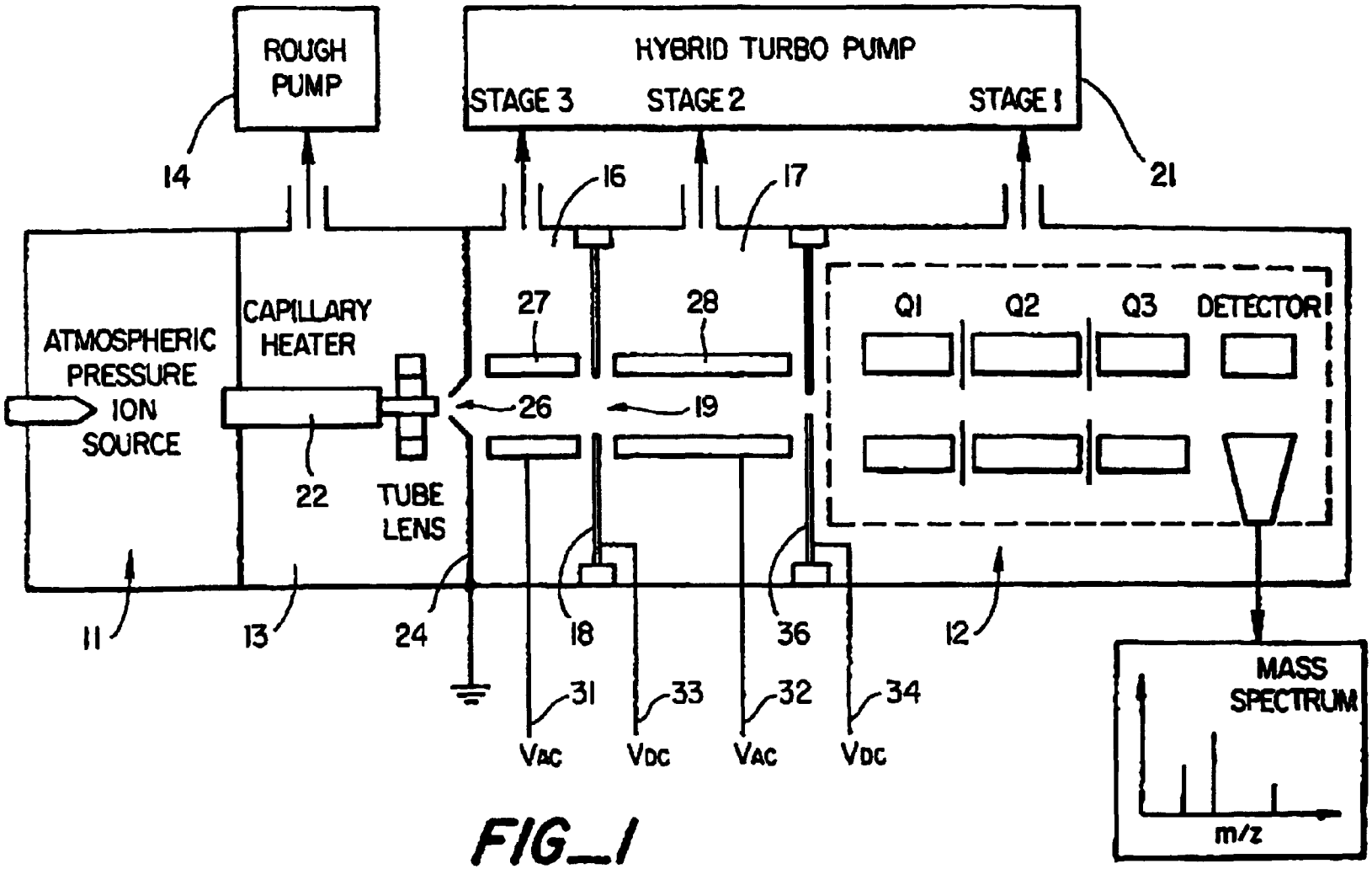
FIG. 1 is a schematic view of a mass spectrometer system including an atmospheric pressure ion source coupled to a tandem mass analyzer through evacuated interface chambers with multipole ion guides.

Referring to FIG. 1, an atmospheric pressure ion source in chamber 11 is interfaced to a tandem mass analyzer 12 via three vacuum pumping stages. The first stage 13 which has the highest pressure is evacuated by an oil-filled rotary vane vacuum pump 14. Other types of vacuum pumps may also be used for this stage, such as a diaphragm pump or scroll pump. A typical pressure for first stage 13 is between 1 and 2 Torr. The second and third stages 15 and 17 are separated by a lens 18 with an orifice 19, which in one example was 1.5 mm in diameter, and can be evacuated by a hybrid or compound turbomolecular pump 21 which includes both turbomolecular and molecular drag pumping stages, and may have multiple inlets into each of these pumping stages, or by individual vacuum pumps (not shown). As will be explained in accordance with the present invention, the pressure in chamber 16 is below 500 mTorr, preferably below 250 mTorr, and more preferably below 175 mTorr; and the pressure in chamber 17 is below 1 mTorr, preferably below 0.7 mTorr, and more preferably below 0.5 mTorr. The pressure in the tandem mass analyzer chamber is approximately $1\times10^{-5}$ Torr or below.

The atmospheric pressure ion source may be an electrospray ion source or atmospheric pressure chemical ionization source. With either ion source, sample liquid is introduced into the chamber 11, which is at a atmospheric pressure, and ionized. The ions are drawn through a capillary 22, which may be heated, into chamber 13. The end of the capillary is opposite a conical skimmer 24 which includes a central orifice or aperture 26. The skimmer separates the low pressure stage 13 from the lower pressure stage 16. A portion of the ion and gas flow is skimmed from the free jet expansion leaving the capillary and enters the second lower pressure stage. The ions which travel through the skimmer are guided into the mass analyzer by first and second multipole ion guides 27 and 28. In one example, the ion guides are square quadrupoles. The guide 27 is 1.25 inches long and the guide 28 is 3.37 inches with the rods separated by 0.118 inches (3 mm). The ion guides are mounted coaxially using polycarbonate holders (not shown). The quadrupole ion guides are operated by applying AC voltages 31 and 32 to the poles which guide ions as is well known. Ions which enter the second and third stages drift under the influence of DC voltage 33 applied between the skimmer lens 24 and lens 18, by DC voltage 34 applied between the lens 18 and the lens 36, and by DC offset voltages applied to ion guides 27 and 28.

As discussed above, solvent adduct ions are formed in the high pressure regions ranging from the atmospheric pressure region to the quadrupole ion guide stages or regions. The degree of adduction is believed to vary directly with the pressure in these regions. The formation of adduct ions can significantly reduce the abundance of sample analyte ions which reach the analyzer. Consequently, effective conversion of the adduct ions into protonated molecular cations or molecular anions ions can greatly enhance the sample ion current and the sensitivity of the mass spectrometer system.

We have discovered that the solvent adduct ions can be dissociated and converted into sample ions in the second ion guide 28 by applying a small DC offset voltage between the ion guide 28 and the lens 18 to increase the energy of the solvent adduct ions. An additional 10 volts DC offset applied to the second ion guide (usually used with a standard 5 V DC offset) is sufficient to convert the solvent adducts into the protonated molecular cation or molecular anion for all compounds tested. In addition, this offset voltage is insufficient to cause fragmentation of the analyte ions at the pressure of the second stage.

Both pumping efficiency and solvent adduction were evaluated. The pumping requirement and vacuum condition on the double ion guide system were compared to a standard TSQ 7000 system sold by ThermoQuest Corporation under the same gas load conditions. Several different compounds including a) acetaminophen; b) Alprazolam; c) codeine-d3; d) ibuprofen were used to investigate the degree of solvent adduction, conversion to protonated molecular cation or molecular anion, and fragmentation of the protonated molecular cation or molecular anion. The solvent used in the experiment was 50:50 acetonitrile:water+5mM ammonium acetate adjusted to a pH of 4.5. Table 1 lists the main experimental conditions, compound, molecular weight and type of solvent adduction investigated.

TABLE 1

| Compound | Molecular Weight | Solvent Adduct | Ion Polarity | LC Flow (μ/min) | Sample Injected (ng) |
|---|---|---|---|---|---|
| Acetaminophen | 151 | Acetonitrile | Positive | 400 | 500 |
| Alprazolam | 308 | Acetonitrile | Positive | 400-1000 | 1.6 |
| Codeine-d3 | 302 | Acetonitrile | Positive | 400-1000 | 50 |

TABLE 1-continued

| Compound | Molecular Weight | Solvent Adduct | Ion Polarity | LC Flow (μ/min) | Sample Injected (ng) |
|---|---|---|---|---|---|
| Ibuprofen | 206 | Acetate | Negative | 200 | 50 |

FIGS. 2–7 show the comparative mass spectra for the four different compounds used in the evaluation under standard (±5 V DC) offset and an incremental 10 V DC (±15 V DC total) offset conditions between the interstage ion lens 18 and the second multipole ion guide 28 indicating that the signal intensity and peak area for the protonated molecular cations or molecular anions can be significantly enhanced by the application of the increased DC offset on the second multipole ion guide 28.

Figure 2A:
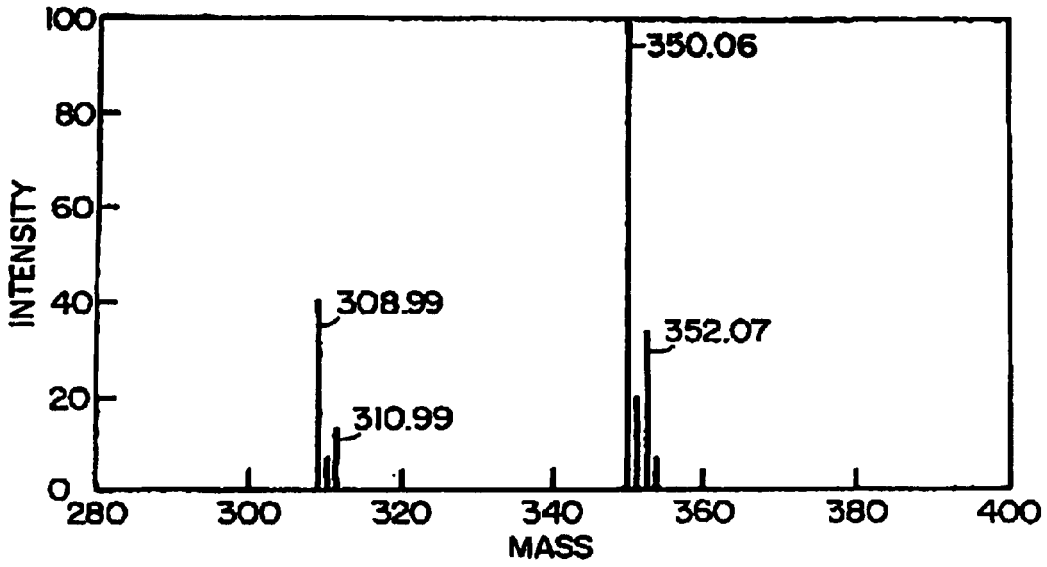
FIGS. 2A and 2B show the mass spectra for an injection of Alprazolam in a liquid stream flowing at 400 microliters per minute (μl/min) with −5 V DC offset and −5 V DC offset applied to the second ion guide.
Figure 2B:
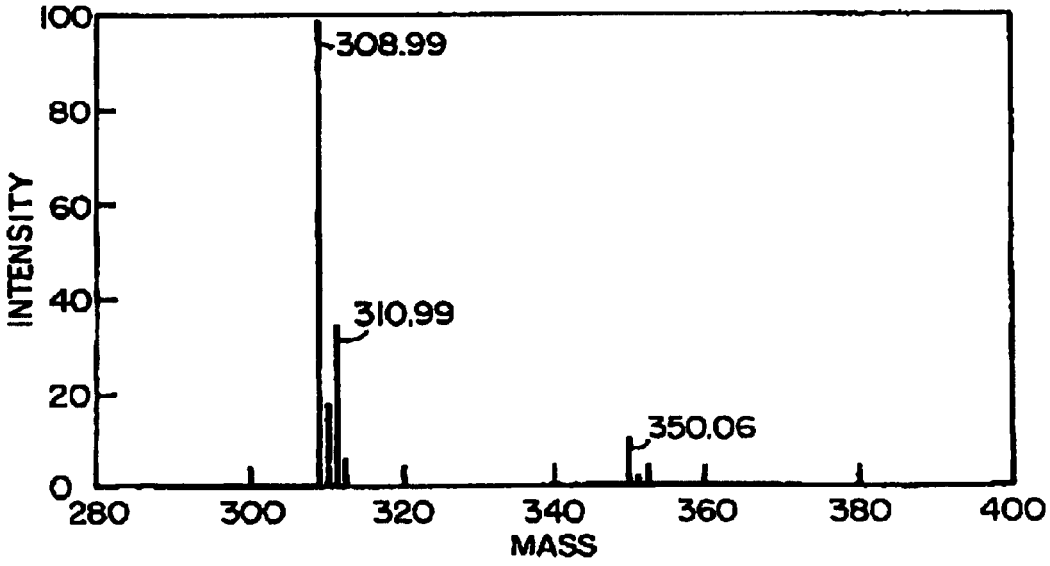

FIG. 2A shows the mass scan for Alprazolam at 400 μl/min liquid chromatograph flow with the standard −5 volt offset, and FIG. 2B shows Alprazolam with an incremental 10 volts of offset at the same flow rate. The increased sample ion signal produced by the incremental offset voltage is apparent.

Figure 3A:
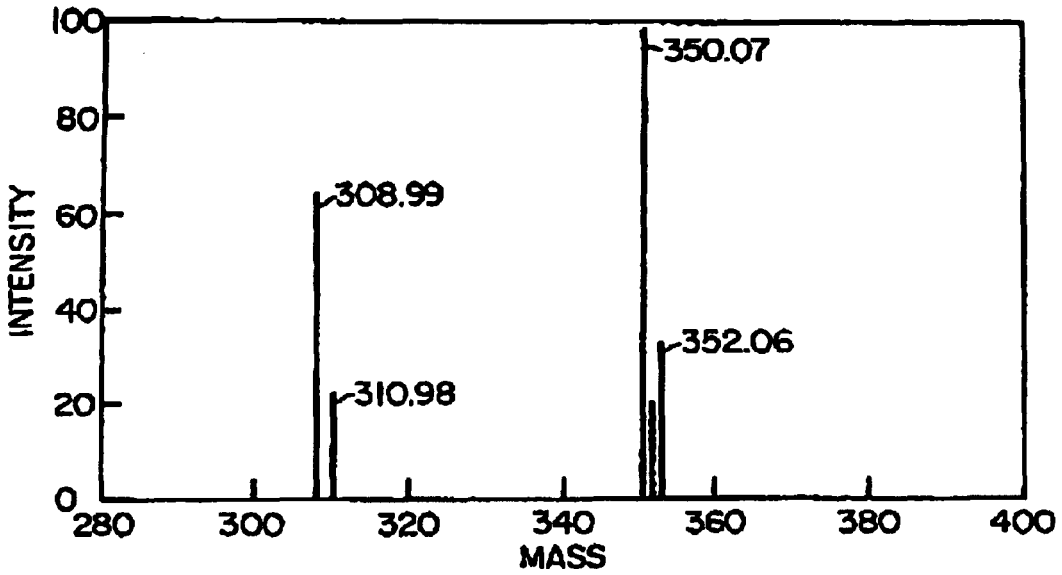
FIGS. 3A and 3B show the mass spectra for an injection of Alprazolam in a liquid stream flowing at 1 milliliter per minute (ml/min) with −5 V DC offset and −15 V DC offset applied to the second ion guide.
Figure 3B:
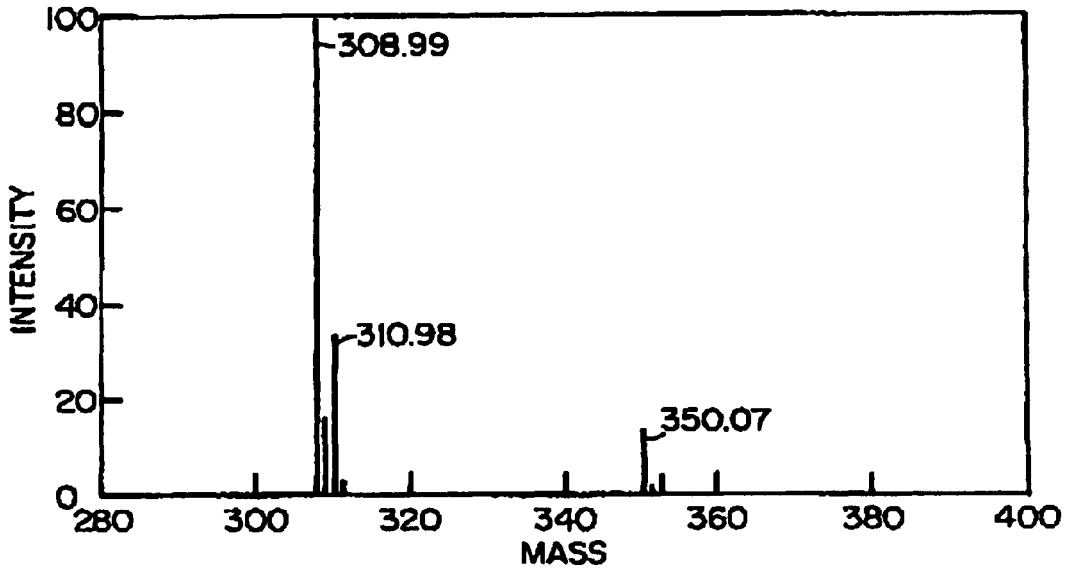
Figure 4A:
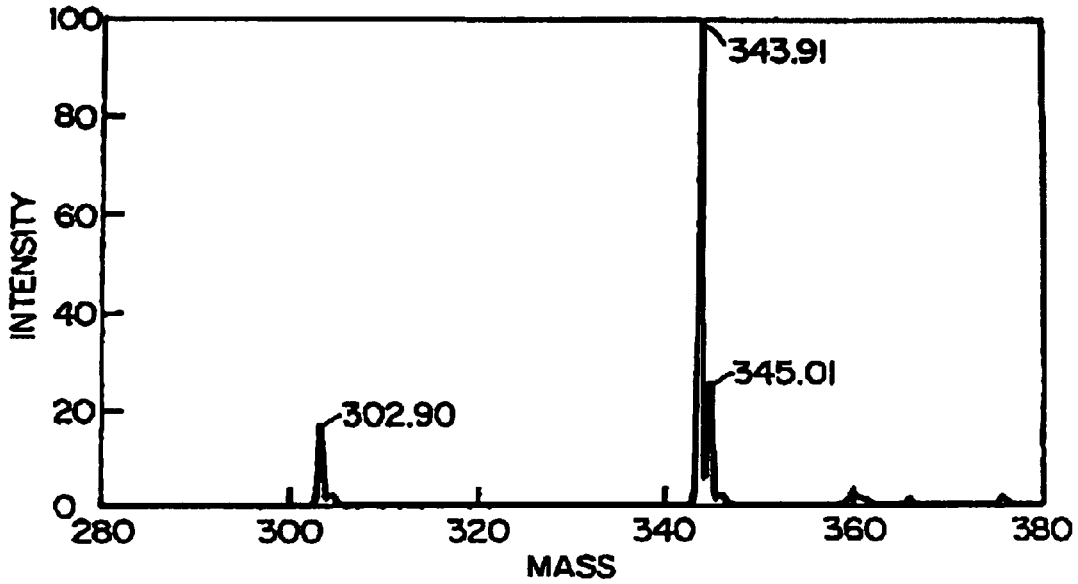
FIGS. 4A and 4B show the mass spectra for an injection of codeine-d3 in a liquid stream flowing at 400 μl/min with −5 V DC offset and −15 V DC offset applied to the second ion guide.
Figure 4B:
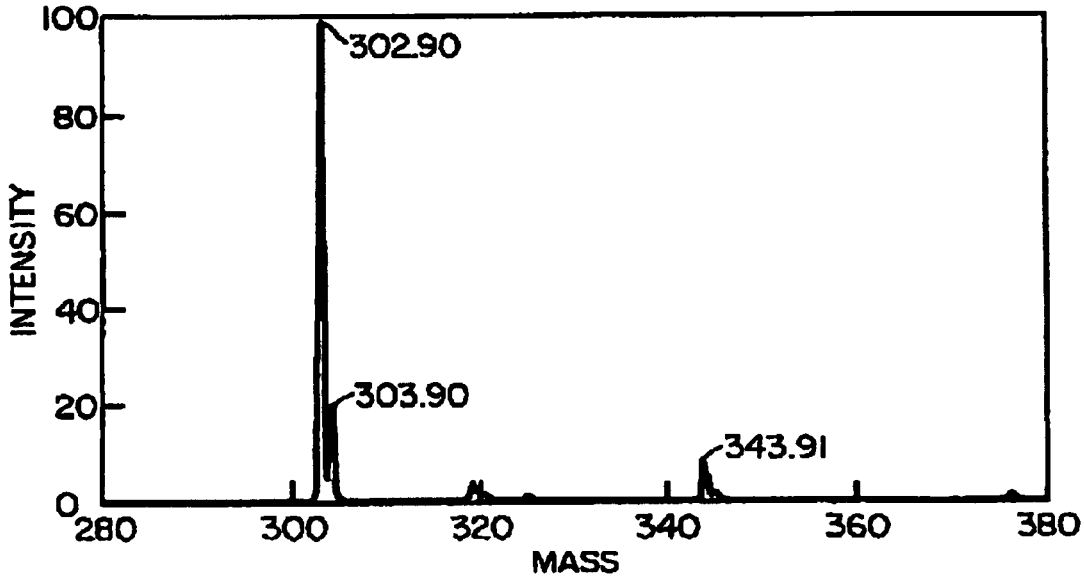
Figure 5A:
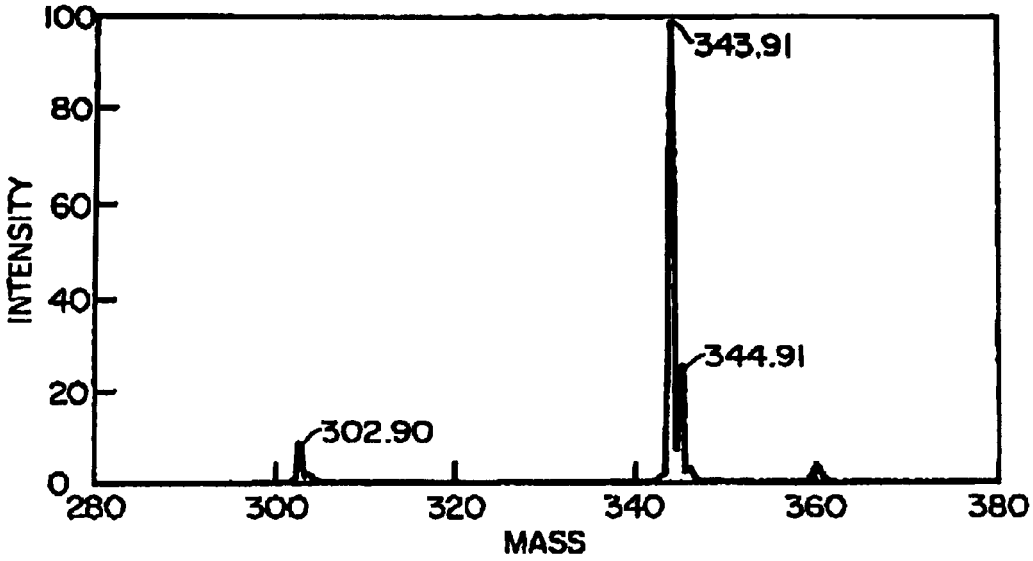
FIGS. 5A and 5B show the mass spectra for an injection of codeine-d3 in liquid stream flowing at 1 ml/min with −5 V DC offset and −15 V DC offset applied to the second ion guide.
Figure 5B:
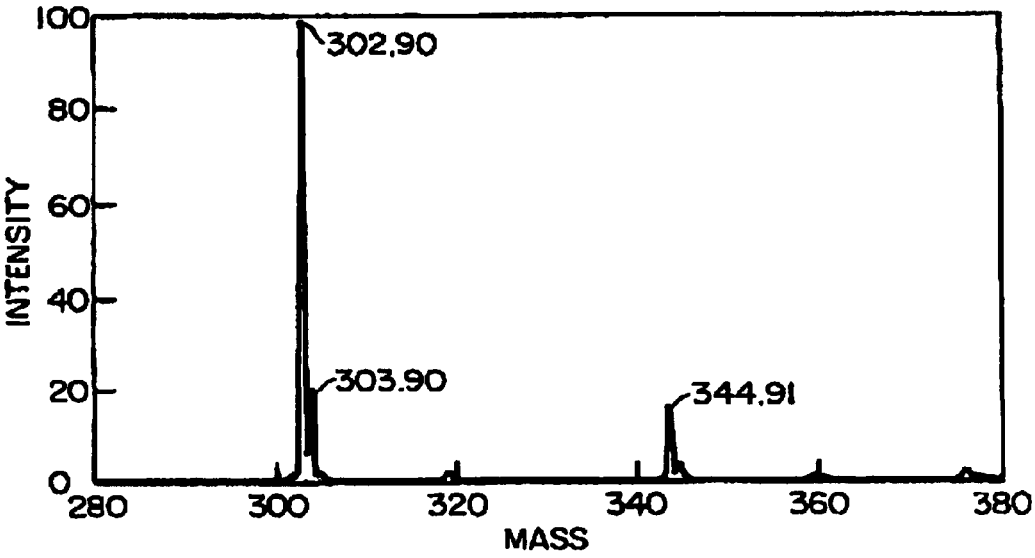
Figure 6A:
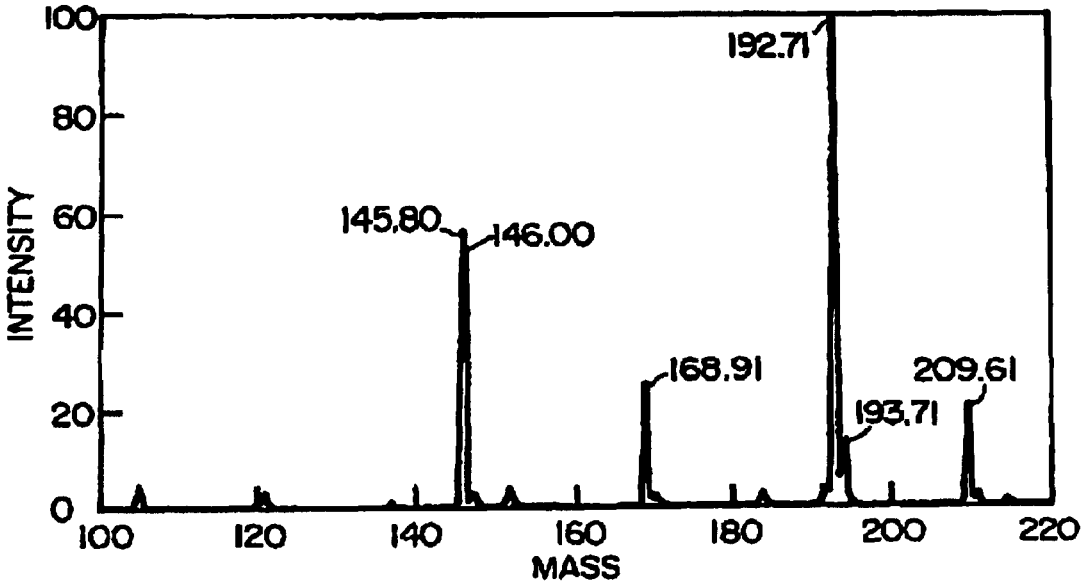
FIGS. 6A and 6B show the mass spectra for in injection of acetaminophen in a liquid stream flowing at 400 μl/min flow with −5 V DC offset and −15 V DC offset applied to the second ion guide.
Figure 6B:
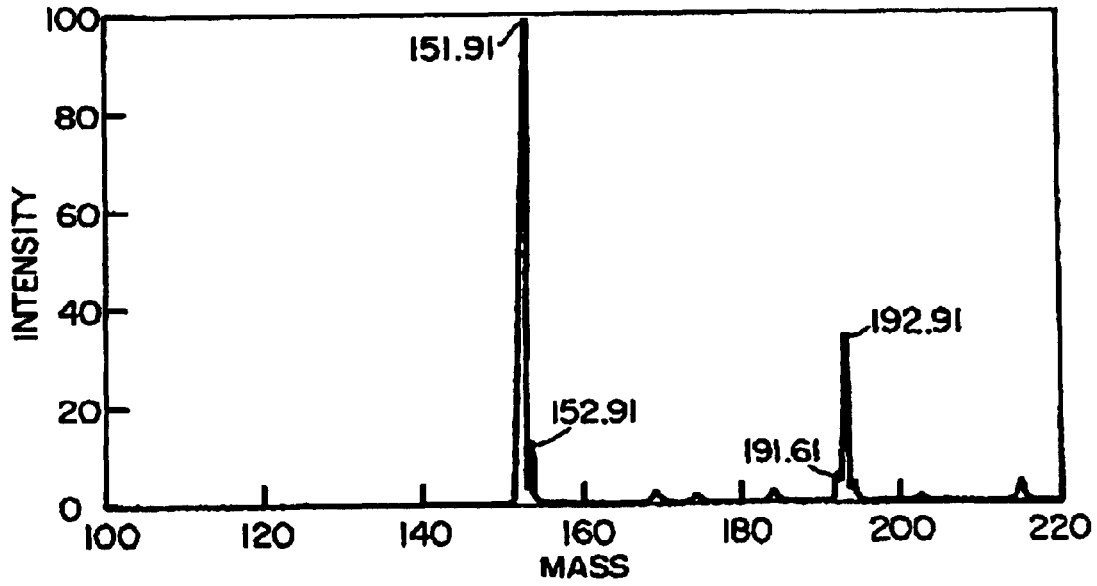
Figure 7A:
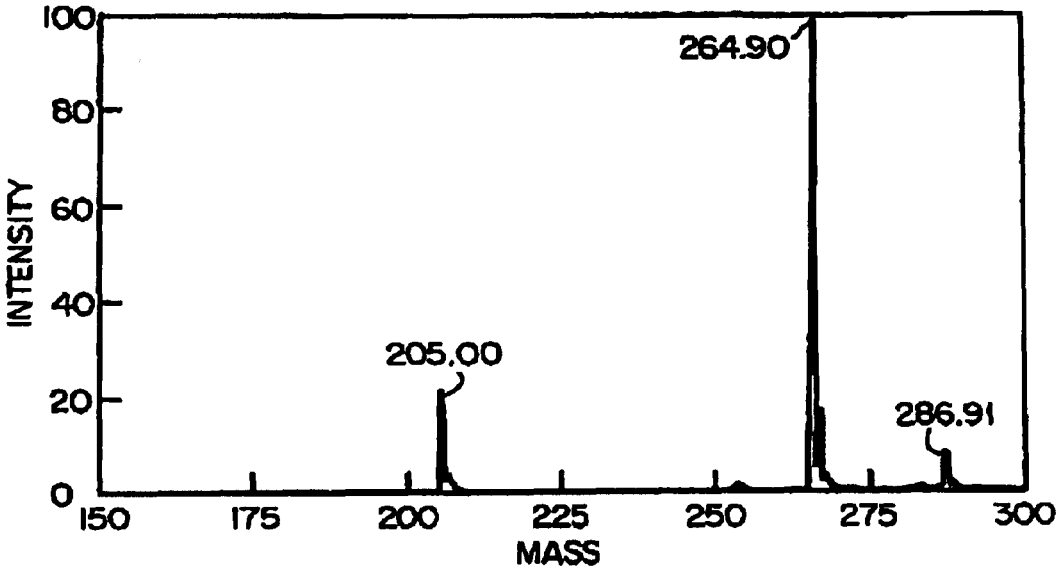
FIGS. 7A and 7B show the mass spectra for an injection of Ibuprofen in a liquid stream flowing at 400 μl/min with +5 V DC offset and +15 V DC offset applied to the second ion guide.
Figure 7B:
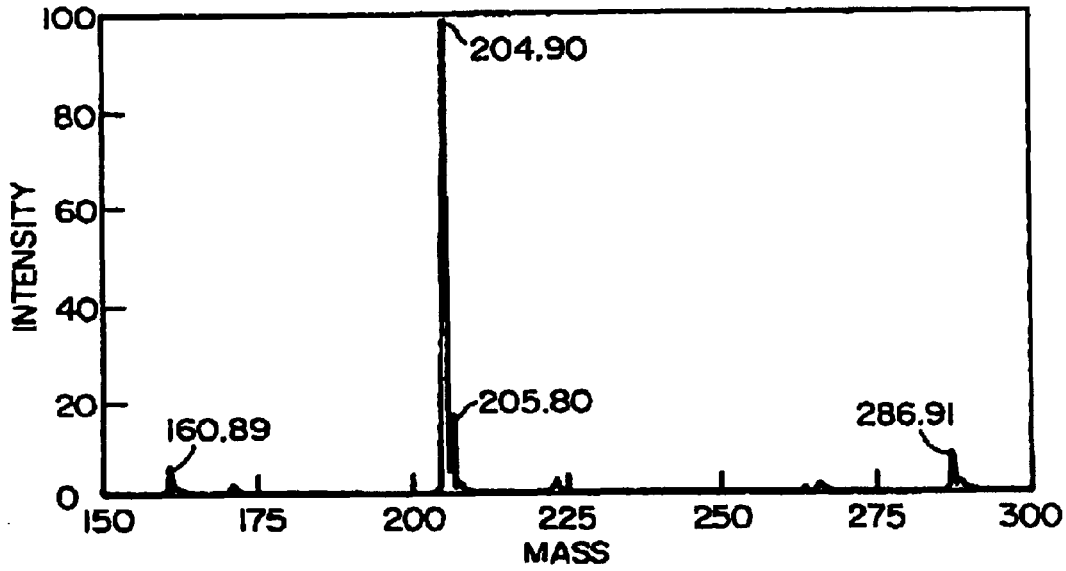

FIGS. 3A and 3B show the mass spectra for Alprazolam at 1 ml/min flow. Again the increased sample ion current is apparent. FIGS. 4A and 4B show the mass spectra for codeine-d3 at 400 μl/min flow with the standard and increased offset voltages. The increased sample ion signal at m/z 302 is apparent. The same mass spectra are shown for 1 ml/min codeine-d3 in FIGS. 5A and 5B. FIGS. 6A and 6B show a comparison of the mass spectra for Acetaminophen at 400 μl/min flow with the standard and increased offset voltages. Again, the vast improvement in sensitivity is apparent. FIGS. 7A and 7B show the mass spectra for ibuprofen flowing at 400 μl/min flow with the standard and increased offset voltages. The improved signal at m/z 205 should be noted.

The DC offset required for high efficiency solvent adduct ion conversion at different vacuum conditions in both first chamber and second chamber was also investigated. The following tables summarize one set of tests in which the ratio of the acetonitrile adduct to the protonated molecular cation of codeine-d3 was investigated at different pressures and different DC offset voltages on the second ion guide.

TABLE 2

| | | | | | |
|---|---|---|---|---|---|
| DC offset on second ion guide (volts) | −5 | −5 | −5 | −5 | −5 |
| First ion guide pressure (mTorr) | 609 | 563 | 502 | 224 | 167 |
| Second ion guide pressure (mTorr) | 1.6 | 1.2 | 1 | 0.7 | 0.5 |
| Ratio of acetonitrile adduct ion to protonated molecular ion | 704% | 926% | 288% | 354% | 248% |
| DC offset on second ion guide (volts) | −15 | −15 | −15 | −15 | −15 |
| First ion guide pressure (mTorr) | 609 | 563 | 502 | 224 | 167 |
| Second ion guide pressure (mTorr) | 1.6 | 1.2 | 1 | 0.7 | 0.5 |
| Ratio of acetonitrile adduct ion to protonated molecular ion | 445% | 407% | 82% | 38% | 17% |
| DC offset on second ion guide (volts) | −35 | −35 | −35 | −35 | −35 |
| First ion guide pressure (mTorr) | 609 | 563 | 502 | 224 | 167 |
| Second ion guide pressure (mTorr) | 1.6 | 1.2 | 1 | 0.7 | 0.5 |
| Ratio of acetonitrile adduct ion to protonated molecular ion | 300% | 248% | 40% | 7% | 3% |

The bold data in Table 2 indicates the range of pressure and offset voltages at which the most efficient conversion of solvent adduct to protonated molecular cation is achieved. According to these results, the operating pressure for the ion guides should be:

First Ion Guide: below 500 mTorr

Second Ion Guide: below 1 mTorr and above 0.1 mTorr

Although the offset voltage which provides the translational kinetic energy to the adduct ions has been described as applied between the interstage lens and the second multipole guide, it is apparent that the translational kinetic energy can be provided by applying the DC offset voltage between the skimmer lens and the first multipole stage or by applying voltages simultaneously between each lens and its respective multipole ion guide. The operating pressure will be the same as above.

The DC offset voltage range for efficient solvent adduction conversion should be ±10 to ±30 Volts, although ±10 V is preferable.

The preferred pressure range is less than 250 mTorr for the first stage and 0.7 mTorr for the second stage, and the most preferred pressure range is less than 175 mTorr for the first stage, and 0.5 mTorr for the second stage.

Figure 8:
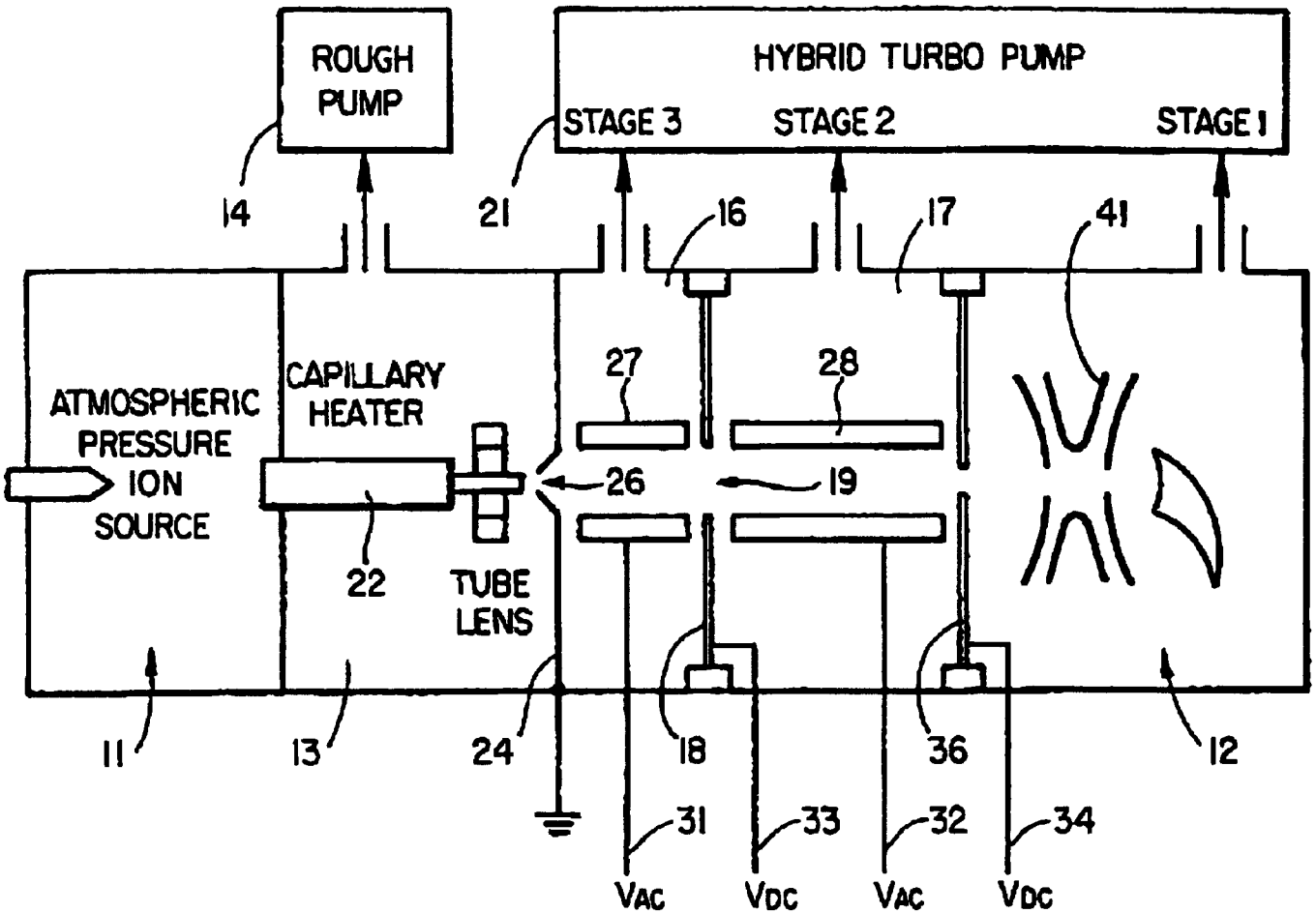
FIG. 8 is a schematic view of a mass spectrometer system as in FIG. 1 with a single quadrupole mass analyzer rather than a tandem mass analyzer or other suitable mass analyzer.

The present invention can be used for other types of mass analyzers such as quadrupole mass analyzers of the type described in U.S. Pat. No. 4,540,884 and U.S. Pat. No. RE 34,000. FIG. 8 shows the interface stages and ion guides associated with a quadrupole mass analyzer 41 disposed in the vacuum chamber 12. Like members have been applied to the parts which correspond to those in FIG. 1. It is apparent that the invention is applicable to other types of mass analyzers such as quadrupole ion trap, ion cyclotron resonance (i.e., magnetic ion trap), time-of-flight, magnetic sector, and double-focusing magnetic/electric sector, monopole, etc.

What is claimed is:

1. A mass spectrometer system including a mass analyzer disposed in a high vacuum chamber for analyzing sample ions formed at atmospheric pressure and directed to the analyzer through intermediate vacuum chambers in which sample ions and solvent molecules form adduct ions with a reduction of sample ion current including:

first and second evacuated chambers directly preceding the mass analyzer chamber with the first chamber being at a higher pressure than the second chamber, a first multipole ion guide in the first chamber for guiding ions into said second chamber, a second multipole ion guide in the second chamber for guiding ions from the first chamber into the high vacuum chamber for mass analysis, and means associated with one or both of said first and second multipole ion guides for increasing the translational kinetic energy of the adduct ions so that at the vacuum pressure of the second interface chamber adduct ions traveling into the chamber are converted into sample ions without fragmentation of sample ions whereby to increase the sample ion current and therefore the sensitivity of the mass spectrometer system.

2. A mass analyzer as in claim 1 including ion lenses preceding each said multipole ion guide and a DC voltage is applied between a selected lens and its associated ion guide to increase the translational kinetic energy of the adduct ions entering the second interface chamber.

3. A method of mass analyzing sample ions produced at atmospheric pressure and introduced into a mass analyzer disposed in a vacuum chamber, and in which some sample ions and solvent molecules combine to form adduct ions with a reduction of sample ions comprising the step of dissociating the adduct ions prior to entry into the mass analyzer to form sample ions to increase the sample ion current entering into the mass analyzer.

4. The method of operating a mass spectrometer system including a mass analyzer which analyzes sample ions formed at atmospheric pressure, and in which some sample ions and solvent molecules combine to form adduct ions with a reduction of sample ions, said system including first and second multipole ion guides disposed in serial first and second evacuated chambers separated by an ion lens for guiding analyte ions into said mass analyzer and an ion lens defining the first evacuated chamber which comprises applying a DC offset voltage between a selected one or both lenses and the succeeding multipole ion guide having an amplitude so as to provide translational kinetic energy to said adduct ions to dissociate the adduct ions without dissociating sample ions at the pressure of the second chamber to increase the sample ion current and the sensitivity of the mass spectrometer system.

5. A mass spectrometer system as in claim 4 in which the pressure in the first chamber is below 500 mTorr, and in the second chamber is below 1 mTorr, and the offset voltage applied between the interchamber lens and the second multipole ion guide is between ±10 volts and ±30 volts.

6. A mass spectrometer system as in claim 5 in which the pressure in the first chamber is less than 250 mTorr, and in the second chamber is less than 0.7 mTorr.

7. A mass spectrometer system as in claim 5 in which the pressure in the first chamber is less than 175 mTorr, and in the second chamber is less than 0.5 mTorr.

8. A mass spectrometer as in claim 6 or 7 in which the offset voltage is ±10 volts.

9. The method of analyzing ions in a mass analyzer which includes a first chamber maintained at a first pressure and a second chamber maintained at a lower pressure comprising the steps of:

forming sample ions at atmospheric pressure with some of the sample ions combining with solvent ions to form adduct ions, guiding said sample ions and adduct ions through at least a first chamber maintained at a first pressure and a second chamber maintained at a lower pressure, adding translational kinetic energy to said adduct ions as they travel through said chambers such that in the second chamber the adduct ions are dissociated without fragmenting the sample ions prior to entering the mass analyzer.

*10. A mass spectrometer system, comprising:*

*an ion source for creating sample ions at atmospheric pressure from a sample which is in association with a solvent;*

*a mass analyzer, disposed in a high vacuum mass analyzer chamber, for analyzing said sample ions;*

*two consecutive multipole ion guides disposed between said ion source and said high vacuum mass analyzer chamber for directing ions from said ion source to said high vacuum mass analyzer chamber, said multipole ion guides maintained at a pressure below atmospheric but higher than the pressure of said high vacuum mass analyzer chamber; and*

*at least one of said multipole ion guides having means associated therewith for defining the translational kinetic energy of ions directed therethrough, and wherein said translational kinetic energy is chosen so that solvent adduct species formed in high pressure regions of the system are converted within said multipole ion guides to sample ions by collision-induced dissociation without fragmentation of sample ions before entering said high vacuum mass analyzer chamber.*

*11. The mass spectrometer system of claim 10 wherein said means is for increasing said translational kinetic energy.*

*12. The mass spectrometer system of claim 10 wherein said two consecutive multipole ion guides are contained, respectively, in two consecutive evacuated chambers.*

*13. The mass spectrometer system of claim 12 wherein the first evacuated chamber containing the first of said multipole ion guides is at a pressure greater than the pressure in the second evacuated chamber containing the second of said multipole ion guides.*

*14. The mass spectrometer system of claim 10 wherein said mass analyzer is a tandem mass analyzer.*

*15. The mass spectrometer system of claim 10 wherein said mass analyzer is a quadrupole ion trap mass analyzer.*

*16. A mass spectrometer system including a mass analyzer disposed in a high vacuum chamber for analyzing sample ions formed at atmospheric pressure and directed to the analyzer through intermediate vacuum chambers in which sample ions and solvent molecules form adduct ions with a reduction of sample ion current including:*

*first and second evacuated chambers directly preceding the mass analyzer chamber with the first chamber being at a higher pressure than the second chamber,*

*a first multipole ion guide in the first chamber for guiding ions into said second chamber,*

*a second multipole ion guide in the second chamber for guiding ions from the first chamber into the high vacuum chamber for mass analysis, and*

*means associated with one or both of said first and second multipole ion guides for defining the translational kinetic energy of the adduct ions so that at the vacuum pressure of the second interface chamber adduct ions traveling into the chamber are converted into sample ions without fragmentation of the sample ions whereby to increase the sample ion current and therefore the sensitivity of the mass spectrometer system.*

*17. A mass spectrometer system including a mass analyzer disposed in a high vacuum chamber for analyzing sample ions formed at atmospheric pressure and directed to the analyzer through one or more intermediate vacuum chambers in which sample ions and solvent molecules form adduct ions with a reduction of sample ion current including:*

*first and second multipole ion guides disposed consecutively in said one or more intermediate vacuum chambers, with said first multipole ion guide maintained at a higher pressure than said second multipole ion guide, for directing ions into the high vacuum chamber for mass analysis, and*

*means associated with one or both of said first and second multipole ion guides for defining the translational kinetic energy of the adduct ions directed therethrough so that at the pressure of said one or both ion guides adduct ions traveling therethrough are converted into sample ions without fragmentation of the sample ions whereby to increase the sample ion current and therefore the sensitivity of the mass spectrometer system.*

*18. A mass spectrometer system according to claim 17 wherein said means is for increasing said translational kinetic energy.*

*19. A mass spectrometer system, including:*

*A. an ion source for creating ions from a sample which is in association with a solvent;*

*B. a first chamber, a second chamber, and a tandem mass analyzer, the first chamber being disposed between the ion source and the second chamber, the second chamber being disposed between the first chamber and the tandem mass analyzer, the first chamber being evacuated to a first pressure, the second chamber being evacuated to a second pressure;*

*C. a first multipole ion guide disposed in the first chamber for guiding ions received in the first chamber towards the second chamber;*

*D. a second multipole ion guide disposed in the second chamber for guiding ions received in the second chamber towards the tandem mass analyzer, at least some of the ions in the second chamber being a solvent adduct species;*

*E. a lens disposed between the first and second multipole ion guides, a voltage difference between the lens and the second multipole ion guide defining a kinetic energy of ions in the second chamber, the kinetic energy being sufficient to dissociate the sample from the solvent in the solvent adduct species without causing fragmentation of the sample ions.*

*20. A mass spectrometer system according to claim 19 wherein the kinetic energy is sufficient to dissociate the sample from the solvent in the solvent adduct species in a majority of the solvent adduct species.*

*21. A mass spectrometer system according to claim 20 wherein the solvent adduct species includes one sample ion and one solvent molecule.*

*22. A mass spectrometer system according to claim 20 wherein the solvent adduct species includes one sample ion and one solvent ion.*

*23. A mass spectrometer system according to claim 20 wherein the ion source is an electrospray ion source.*

*24. A mass spectrometer system according to claim 23 wherein the ion source is an atmospheric pressure electrospray ion source.*

*25. A mass spectrometer system according to claim 20 wherein the ion source is an atmospheric pressure chemical ionization source.*

*26. A mass spectrometer system according to claim 20, the tandem mass analyzer including a Q1 stage, a Q2 stage, a Q3 stage, and a detector, the Q1 stage including a first multipole rod structure, the Q2 stage including a second multipole rod structure, and the Q3 stage including a third multipole rod structure.*

*27. A mass spectrometer system according to claim 20, the first pressure being higher than the second pressure.*

*28. A mass spectrometer system according to claim 20, the first ion guide being a quadrupole ion guide.*

*29. A mass spectrometer system according to claim 20, the second ion guide being a quadrupole ion guide.*

*30. A mass spectrometer system, including:*

*A. an ion source for creating ions from a sample which is in association with a solvent;*

*B. a first chamber, a second chamber, and a tandem mass analyzer, the first chamber being disposed between the ion source and the second chamber, the second chamber being disposed between the first chamber and the tandem mass analyzer, the first chamber being evacuated to a first pressure, the second chamber being evacuated to a second pressure;*

*C. a first multipole ion guide disposed in the first chamber for guiding ions received in the first chamber towards the second chamber;*

*D. a second multipole ion guide disposed in the second chamber for guiding ions received in the second chamber towards the tandem mass analyzer, at least some of the ions in the second chamber being a solvent adduct species;*

*E. a first lens disposed between the first and second multipole ion guides, and a second lens disposed between*

*the ion source and the first multipole ion guide, a voltage difference between the first or second lenses and the second multipole ion guide defining a kinetic energy of ions in the second chamber, the kinetic energy being sufficient to dissociate the sample from the solvent in the solvent adduct species without causing fragmentation of the sample ions.*

*31. A mass spectrometer system, including:*

*A. an ion source for creating ions from a sample which is in association with a solvent;*

*B. a first chamber, a second chamber, and a tandem mass analyzer, the first chamber being disposed between the ion source and the second chamber, the second chamber being disposed between the first chamber and the tandem mass analyzer, the first chamber being evacuated to a first pressure, the second chamber being evacuated to a second pressure;*

*C. a first multipole ion guide disposed in the first chamber for guiding ions received in the first chamber towards the second chamber;*

*D. a second multiple ion guide disposed in the second chamber for guiding ions received in the second chamber towards the tandem mass analyzer, at least some of the ions in the second chamber being a solvent adduct species;*

*E. a lens disposed between the first and second multipole ion guides, a voltage difference between the lens and the second multipole ion guide increasing a kinetic energy of ions in the second chamber, the kinetic energy being sufficient to dissociate the sample from the solvent in the solvent adduct species without causing fragmentation of the sample ions.*

*32. A mass spectrometer system according to claim 31 wherein the kinetic energy is sufficient to dissociate the sample from the solvent in the solvent adduct species in a majority of the solvent adduct species.*

*33. A mass spectrometer system according to claim 32 wherein the solvent adduct species includes one sample ion and one solvent molecule.*

*34. A mass spectrometer system according to claim 32 wherein the solvent adduct species includes one sample ion and one solvent ion.*

*35. A mass spectrometer system according to claim 32 wherein the ion source is an electrospray ion source.*

*36. A mass spectrometer according to claim 35 wherein the ion source is an atmospheric pressure electrospray ion source.*

*37. A mass spectrometer system according to claim 32 wherein the ion source is an atmospheric pressure chemical ionization source.*

*38. A mass spectrometer system according to claim 32, the tandem mass analyzer including a Q1 stage, a Q2 stage, a Q3 stage, and a detector, the Q1 stage including a first multipole rod structure, the Q2 stage including a second multipole rod structure, and the Q3 stage including a third multipole rod structure.*

*39. A mass spectrometer system according to claim 32, the first pressure being higher than the second pressure.*

*40. A mass spectrometer system according to claim 32, the first ion guide being a quadrupole ion guide.*

*41. A mass spectrometer system according to claim 32, the second ion guide being a quadrupole ion guide.*

*42. A mass spectrometer system, including:*

*A. an ion source for creating ions from a sample which is in association with a solvent;*

*B. a first chamber, a second chamber, and a tandem mass analyzer, the first chamber being disposed between the ion source and the second chamber, the second chamber being disposed between the first chamber and the tandem mass analyzer, the first chamber being evacuated to a first pressure, the second chamber being evacuated to a second pressure;*

*C. a first multipole ion guide disposed in the first chamber for guiding ions received in the first chamber towards the second chamber;*

*D. a second multipole ion guide disposed in the second chamber for guiding ions received in the second chamber towards the tandem mass analyzer, at least some of the ions in the second chamber being a solvent adduct species;*

*E. a first lens disposed between the first and second multipole ion guides, and a second lens disposed between the ion source and the first multipole ion guide, a voltage difference between the first or second lenses and the second multipole ion guide increasing a kinetic energy of ions in the second chamber, the kinetic energy being sufficient to dissociate the sample from the solvent in the solvent adduct species without causing fragmentation of the sample ions.*

* * * * *

UNITED STATES PATENT AND TRADEMARK OFFICE

CERTIFICATE OF CORRECTION

PATENT NO. : RE 40,632 E
APPLICATION NO. : 11/073394
DATED : February 3, 2009
INVENTOR(S) : Keqi Tang et al.

It is certified that error appears in the above-identified patent and that said Letters Patent is hereby corrected as shown below:

At column 4, line 27, replace "in liquid stream" with -- in a liquid stream --; at column 4, line 30, replace "for in injection" with -- for an injection --; and at column 4, line 52, replace "stages 15 and 17" with -- stages 16 and 17 --.

At column 5, line 2, replace "at a atmospheric" with -- at atmospheric --.

At claim 3, line 57, insert -- , through consecutive multipole ion guides, -- after the word "introduced"; at claim 3, line 58, insert -- which is at a pressure lower than that of said multipole ion guides -- between the word "chamber" and the comma; and at claim 3, line 60, insert -- , -- after the word "ions".

At claim 5, line 14, replace "mass spectrometer system" with -- method --; at claim 6, line 19, replace "mass spectrometer system" with -- method --; and at claim 7, line 22, replace "mass spectrometer system" with -- method --.

At claim 8, line 26, replace "mass spectrometer" with -- method --.

At claim 9, line 27, replace "The" with -- A --; at claim 9 cancel the text beginning at line 27 with "which" and ending at line 29 with "pressure"; at claim 9, line 35, following "pressure" insert -- and containing a multipole ion guide --; at claim 9, line 36, following "pressure" insert -- and containing a multipole ion guide --; and at claim 9, line 38, following "chambers" insert -- and said multipole ion guides --.

At claim 31, line 20, replace "multiple" with -- multipole --.

Signed and Sealed this

Fifth Day of January, 2010

David J. Kappos

David J. Kappos
*Director of the United States Patent and Trademark Office*

UNITED STATES PATENT AND TRADEMARK OFFICE

CERTIFICATE OF CORRECTION

PATENT NO. : RE 40,632 E
APPLICATION NO. : 11/073394
DATED : February 3, 2009
INVENTOR(S) : Keqi Tang et al.

It is certified that error appears in the above-identified patent and that said Letters Patent is hereby corrected as shown below:

At column 4, line 27, replace "in liquid stream" with -- in a liquid stream --; at column 4, line 30, replace "for in injection" with -- for an injection --; and at column 4, line 52, replace "stages 15 and 17" with -- stages 16 and 17 --.

At column 5, line 2, replace "at a atmospheric" with -- at atmospheric --.

Column 7, at claim 3, line 57, insert -- , through consecutive multipole ion gudes, -- after the word "introduced"; at Column 7, claim 3, line 58, insert -- which is at a pressure lower than that of said multipole ion guides -- between the word "chamber" and the comma; and at Column 7, claim 3, line 60, insert -- , -- after the word "ions" .

Column 8, At claim 5, line 14, replace "mass spectrometer system" with -- method --; at Column 8, claim 6, line 19, replace "mass spectrometer system" with -- method --; and at column 8, claim 7, line 22, replace "mass spectrometer system" with -- method --.

At claim 8, line 26, replace "mass spectrometer" with -- method --.

Column 8, At claim 9, line 27, replace "The" with -- A --; at claim 9 cancel the text beginning at line 27 with "which" and ending at line 29 with "pressure"; at claim 9, line 35, following "pressure" insert -- and containing a multipole ion guide --; at claim 9, line 36, following "pressure" insert -- and containing a multipole ion guide --; and at claim 9, line 38, following "chambers" insert -- and said multipole ion guides --.

Column 11, At claim 31, line 20, replace "multiple" with -- multipole --.

This certificate supersedes the Certificate of Correction issued January 5, 2010.

Signed and Sealed this

Twenty-sixth Day of January, 2010

David J. Kappos

David J. Kappos
*Director of the United States Patent and Trademark Office*